United States Patent
Mok et al.

(10) Patent No.: US 10,468,977 B2
(45) Date of Patent: Nov. 5, 2019

(54) POWER CONTROLLER AND POWER CONTROL METHOD

(71) Applicant: The University of Hong Kong, Hong Kong (CN)

(72) Inventors: Kwan Tat Mok, Hong Kong (CN); Siew Chong Tan, Hong Kong (CN); Shu Yuen Ron Hui, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 0 days.

(21) Appl. No.: 15/526,988

(22) PCT Filed: Nov. 13, 2014

(86) PCT No.: PCT/CN2014/090992
§ 371 (c)(1),
(2) Date: May 15, 2017

(87) PCT Pub. No.: WO2016/074191
PCT Pub. Date: May 19, 2016

(65) Prior Publication Data
US 2017/0324319 A1     Nov. 9, 2017

(51) Int. Cl.
*H02M 1/42*     (2007.01)
*H02J 3/18*     (2006.01)
(Continued)

(52) U.S. Cl.
CPC ............. *H02M 1/4208* (2013.01); *H02J 3/18* (2013.01); *H02J 3/382* (2013.01); *H02M 5/293* (2013.01);
(Continued)

(58) Field of Classification Search
CPC .................................. G05F 1/455; G05F 1/565
(Continued)

(56) References Cited

U.S. PATENT DOCUMENTS 5,019,958 A * 5/1991 Varga ...................... H02P 23/16
                                               318/615
5,798,631 A     8/1998    Spée et al.
(Continued)

FOREIGN PATENT DOCUMENTS

CN     102638170 A     8/2012
CN     103339815 A     10/2013
(Continued)

OTHER PUBLICATIONS

Hui, Shuyuen Ron et al. Electric Springs—A New Smart Grid Technology, IEEE Transactions on Smart Grid, Sep. 2012, pp. 1552-1561, vol. 3, IEEE.
(Continued)

*Primary Examiner* — Gary A Nash
(74) *Attorney, Agent, or Firm* — Saliwanchik, Lloyd & Eisenschenk

(57) ABSTRACT

A power controller for an AC power converter connected in series with a load and receiving power from or delivering power to a power source, the power controller comprising: a radial control block controlling a radial component of an electrical parameter of the AC power converter; and a chordal control block controlling a chordal component of the electrical parameter of the AC power converter. Also provided is a power system comprising one or more loads each connected in series to a power converter each controlled by a power controller as described above. There is also provided a method of controlling an AC power converter connected in series with a load and receiving power from a power source, the method comprising: controlling a radial component of an electrical parameter of the AC power converter; and controlling a chordal component of the electrical parameter of the AC power converter.

23 Claims, 27 Drawing Sheets

(51) Int. Cl.
*H02M 7/5387* (2007.01)
*H02J 3/38* (2006.01)
*H02M 7/219* (2006.01)
*H02M 5/293* (2006.01)
*G05F 1/455* (2006.01)
*G05F 1/565* (2006.01)
*H02M 1/00* (2006.01)

(52) U.S. Cl.
CPC ......... *H02M 7/219* (2013.01); *H02M 7/5387* (2013.01); *G05F 1/455* (2013.01); *G05F 1/565* (2013.01); *H02M 2001/0003* (2013.01); *H02M 2001/0093* (2013.01); *H02M 2001/4275* (2013.01); *H02M 2005/2932* (2013.01); *Y02B 70/126* (2013.01); *Y02E 40/30* (2013.01)

(58) Field of Classification Search
USPC ........... 323/213, 241, 275, 283, 285; 363/78
See application file for complete search history.

(56) References Cited

U.S. PATENT DOCUMENTS

| | | | |
|---|---|---|---|
| 5,883,796 | A | 3/1999 | Cheng et al. |
| 6,621,252 | B2 | 9/2003 | Zhang |
| 7,157,804 | B2 | 1/2007 | Kimura et al. |
| 7,471,525 | B2 | 12/2008 | Suzuki et al. |
| 7,561,451 | B2 * | 7/2009 | Tracy ................... H02M 7/219 323/212 |
| 8,378,644 | B2 | 2/2013 | Said et al. |
| 2008/0219036 | A1 * | 9/2008 | Colombi ................ H02J 9/062 363/126 |
| 2012/0080420 | A1 * | 4/2012 | Hui ........................... H02J 3/24 219/482 |
| 2013/0039105 | A1 * | 2/2013 | Rozman ................ H02M 1/126 363/126 |
| 2013/0094264 | A1 * | 4/2013 | Crookes ................ H02J 3/1835 363/127 |
| 2013/0272042 | A1 * | 10/2013 | Moallem ............... H02M 7/217 363/89 |
| 2013/0322139 | A1 | 12/2013 | Lee et al. |
| 2015/0115905 | A1 | 4/2015 | Hui et al. |

FOREIGN PATENT DOCUMENTS

| | | |
|---|---|---|
| WO | WO-2013/153075 A2 | 10/2013 |
| WO | WO-2006123006 A1 | 11/2016 |

OTHER PUBLICATIONS

International Search Report in International Application No. PCT/CN2014/090992, filed Nov. 13, 2014.
Tan, Siew-Chong et al., General Steady-State Analysis and Control Principle of Electric Springs With Active and Reactive Power Compensations, IEEE Transactions on Power Electronics, Aug. 2013, 28(8):3958-3969, IEEE.
Tan, S.C. et al., Adaptive ac and/or dc power supply, U.S. Appl. No. 61/844,277, filed Jul. 9, 2013.
Supplementary European Search Report dated Apr. 26, 2018 in European Application No. 14905989.1.

* cited by examiner

POWER CONTROLLER AND POWER CONTROL METHOD

CROSS-REFERENCE TO RELATED APPLICATION

This application is the U.S. national stage application of International Patent Application No. PCT/CN2014/090992, filed Nov. 13, 2014, the disclosures of which is hereby incorporated by reference in its entirety.

FIELD OF THE INVENTION

The present invention relates to power controllers and power control methods, and in particular, power controllers and power control methods for electric springs, static synchronous series compensators (SSSC), and other DC/AC power converters. The present invention has been described herein primarily in relation to controlling smart loads that perform active and reactive power compensation, but is not limited to this particular application.

BACKGROUND OF THE INVENTION

The traditional direct-quadrature-zero (or dq0 or dqo) and alpha-beta ($\alpha\beta\gamma$) transformation methods are usually adopted in control methods for power converters, synchronous machines and electronic devices in three-phase AC power systems. Reference can be made to the following patents:

[1] W. Said et al., "Active rectification for a variable-frequency synchronous generator," Feb. 19, 2013, U.S. Pat. No. 8,378,644;
[2] T. Suzuki et al., "Converter and power converter that becomes it with the converter," Dec. 30, 2008, U.S. Pat. No. 7,471,525;
[3] M. Kimura et al., "Electrical rotating machine control unit and power generation system," Sep. 18, 2007, U.S. Pat. No. 7,271,500; and
[4] S. Bhowmik et al., "Performance optimization controller and control method for doubly-fed machines," Aug. 25, 1998, U.S. Pat. No. 5,798,631.

The dq0-transformation can also be used in single phase systems in view of simplifying controller designs. Reference can be made to the following patent:

[5] R. Zhang, "Control of single-phase power converter in d-q rotating coordinates," Sep. 16, 2003, U.S. Pat. No. 6,621,252.

The main advantage of these transformation methods is that they convert AC quantities into DC quantities, which can simplify the design of the control loop.

Recently, a new power electronic device known as an electric spring (ES), which is used in series connection with a non-critical load (such as thermal heaters) to form a smart load for active and reactive power compensation, has been invented. Reference can be made to the following articles and patents:

[6] S. Y. R. Hui et al., "Electric springs—a new smart grid technology," IEEE Transactions on Smart Grid, vol. 3, no. 3, pp. 1552-1561, 2012;
[7] S. C. Tan et al., "General steady-state analysis and control principle of electric springs with active and reactive power compensations," IEEE Transactions on Power Electronics, vol. 28, no. 8, pp. 3958-3969, 2013;
[8] S. Y. R. Hui et al., "Power control circuit and method for stabilizing a power supply," Oct. 3, 2011, U.S. patent application Ser. No. 13/251,823;
[9] N. Chaudhuri et al., "Control methods for distributed power systems," 2012, UK Patent Application No: 1206318.6;
[10] C. K. Lee et al., "Input AC voltage control bi-directional power converters," May 31, 2013, U.S. patent application Ser. No. 13/907,350; and
[11] S. C. Tan et al., "Adaptive ac and/or dc power supply," Jul. 9, 2013, U.S. Non-provision Patent No. 61/844,277.

The basic functionality of an ES is to regulate the electrical parameters of a power network such that its line voltage and frequency are within predetermined operating limits. However, existing controllers and control methods do not provide precise and flexible control of electrical parameters in a power network that employs ESs. This is of prime importance to the widespread application of ESs.

It is an object of the present invention to overcome or ameliorate at least one of the disadvantages of the prior art, or to provide a useful alternative.

Throughout this specification, a reference is initially cited with a number in square brackets and further citations of the same reference are made by citing said number in square brackets.

SUMMARY OF THE INVENTION

An embodiment of a first aspect of the present invention provides a power controller for an AC power converter connected in series with a load and receiving power from or delivering power to a power source, the power controller comprising:

a radial control block controlling a radial component of an electrical parameter of the AC power converter; and a chordal control block controlling a chordal component of the electrical parameter of the AC power converter.

In one embodiment, the electrical parameter is one of: voltage, current, power, or frequency.

In one embodiment, the power controller comprises a first, second, and third inputs, wherein the first input is a magnitude of the electrical parameter of the power source, the second input is a desired magnitude of the radial component of the electrical parameter of the AC power converter, and the third input is a desired difference between a phase angle of the electrical parameter of the power source and a phase angle of the electrical parameter of the load.

In one embodiment, the electrical parameter is voltage and the radial control block controls the radial component in accordance with the following relationships:

$$\theta_{pr} = \begin{cases} \theta_o & \text{for } |V_o| < |V_s| \\ 0 & \text{for } |V_o| = |V_s| \text{ (No radial-component)} \\ \theta_o - \pi & \text{for } |V_o| > |V_s| \end{cases}$$

and $$|V_{pr}| = ||V_o| - |V_s||.$$

In one embodiment, the electrical parameter is voltage and the chordal control block controls the chordal component in accordance with the following relationship:

$$\begin{cases} \theta_{pc} = f_{\theta-chordal}(\theta_o) = -\text{sgn}(\theta_o) \cdot \dfrac{\pi - |\theta_o|}{2} \\ |V_{pc}| = f_{V-chordal}(\theta_o) = \sqrt{2|V_s|^2(1-\cos\theta_o)} \end{cases} \text{ for } -\pi < \theta_o < \pi.$$

In one embodiment, the power controller comprises a summation block combining the radial and chordal components of the electrical parameter of the AC power converter output by the radial and chordal control blocks respectively to provide a reference magnitude and a reference phase angle for the electrical parameter of the AC power converter.

In one embodiment, the power source is a power grid and the power controller controls the radial and chordal components of the electrical parameter of the AC power converter in accordance with required values of one or more reference electrical parameters of the power grid.

In one embodiment, the power controller controls the radial and chordal components of the electrical parameter of the AC power converter in accordance with required values of one or more reference electrical parameters of the load or the power source.

In one embodiment, the reference electrical parameters are one or more of the following: voltage, current, power, and power factor.

In one embodiment, the power controller controls the radial and chordal components of the electrical parameter of the AC power converter to provide active and reactive power compensation to the power source.

In one embodiment, the power controller is integrated with the AC power converter. In one embodiment, the power controller and the AC power converter are integrated with the load.

In a second aspect, an embodiment of the present invention provides a power system comprising one or more loads each connected in series to an AC power converter each controlled by a power controller as described above.

In a third aspect, an embodiment of the present invention provides a method of controlling an AC power converter connected in series with a load and receiving power from or delivering power to a power source, the method comprising:

controlling a radial component of an electrical parameter of the AC power converter; and controlling a chordal component of the electrical parameter of the AC power converter.

In one embodiment, the electrical parameter is one of: voltage, current, power, or frequency.

In one embodiment, the method further comprises controlling the radial and chordal components based on a magnitude of the electrical parameter of the power source, a desired magnitude of the radial component of the electrical parameter of the AC power converter, and a desired difference between a phase angle of the electrical parameter of the power source and a phase angle of the electrical parameter of the load.

In one embodiment, the electrical parameter is voltage and the radial component is controlled in accordance with the following relationships:

$$\theta_{pr} = \begin{cases} \theta_o & \text{for } |V_o| < |V_s| \\ 0 & \text{for } |V_o| = |V_s| \text{ (No radial-component)} \\ \theta_o - \pi & \text{for } |V_o| > |V_s| \end{cases}$$

and $$|V_{pr}| = ||V_o| - |V_s||.$$

In one embodiment, the electrical parameter is voltage and the chordal component is controlled in accordance with the following relationship:

$$\begin{cases} \theta_{pc} = f_{\theta-chordal}(\theta_o) = -\text{sgn}(\theta_o) \cdot \dfrac{\pi - |\theta_o|}{2} \\ |V_{pc}| = f_{V-chordal}(\theta_o) = \sqrt{2|V_s|^2(1 - \cos\theta_o)} \end{cases} \text{for } -\pi < \theta_o < \pi.$$

In one embodiment, the method further comprises combining the radial and chordal components of the electrical parameter of the AC power converter to provide a reference magnitude and a reference phase angle for the electrical parameter of the AC power converter.

In one embodiment, the power source is a power grid and the radial and chordal components of the electrical parameter of the AC power converter are controlled in accordance with required values of one or more reference electrical parameters of the power grid.

In one embodiment, the radial and chordal components of the electrical parameter of the AC power converter are controlled in accordance with required values of one or more reference electrical parameters of the load or the power source.

In one embodiment, the reference electrical parameters are one or more of the following: voltage, current, power, and power factor.

In one embodiment, the radial and chordal components of the electrical parameter of the AC power converter are controlled to provide active and reactive power compensation to the power source.

BRIEF DESCRIPTION OF THE FIGURES

The foregoing and other features of the present invention will be more readily apparent from the following detailed description and figures of illustrative embodiments of the present invention wherein like reference numerals refer to like parts throughout the various figures unless otherwise specified and in which:

FIGS. 7A and 7B are schematic diagrams of possible topologies of an AC power converter that can provide reactive power compensation, in which FIG. 7A shows a full-bridge topology and FIG. 7B shows a half-bridge topology, and in which one or more capacitors are connected to the DC link of these topologies;

FIGS. 8A and 8B are schematic diagrams of possible topologies of an AC power converter that can provide active and reactive power compensation, in which FIG. 8A shows a full-bridge topology and FIG. 8B shows a half-bridge topology, and in which one or more capacitors and one or more batteries are connected to the DC link of these topologies;

FIGS. 13A, 13B, 13C, 13D, 13E, and 13F are graphs of steady-state waveforms of an AC system in different modes of operation under the control of a RCD power controller in accordance with an embodiment of the present invention, with the waveforms depicting noncritical load voltage, smart load current, grid voltage, and power converter voltage shown in the left column of each graph and with measured smart load electrical parameters, namely smart load rms voltage, smart load rms current, smart load real power, grid frequency, smart load reactive power and smart load power factor, shown in the right column of each graph, and in which FIG. 13A shows the waveforms under radial control with $V_{pr\_Ref}$=+50 V, FIG. 13B shows the waveforms under radial control with $V_{pr\_Ref}$=−50 V, FIG. 13C shows the waveforms under chordal control with $\theta_{o\_Ref}$=+10°, FIG. 13D shows the waveforms under chordal control with $\theta_{o\_Ref}$=−10°, FIG. 13E shows the waveforms under both radial and chordal control with $V_{pr\_Ref}$=+50 V and $\theta_{o\_Ref}$=+10°, and FIG. 13F shows the waveforms under both radial and chordal control with $V_{pr\_Ref}$=−50 V and $\theta_{o\_Ref}$=−10°;

DETAILED DESCRIPTION OF EMBODIMENTS OF THE INVENTION

Figure 1:
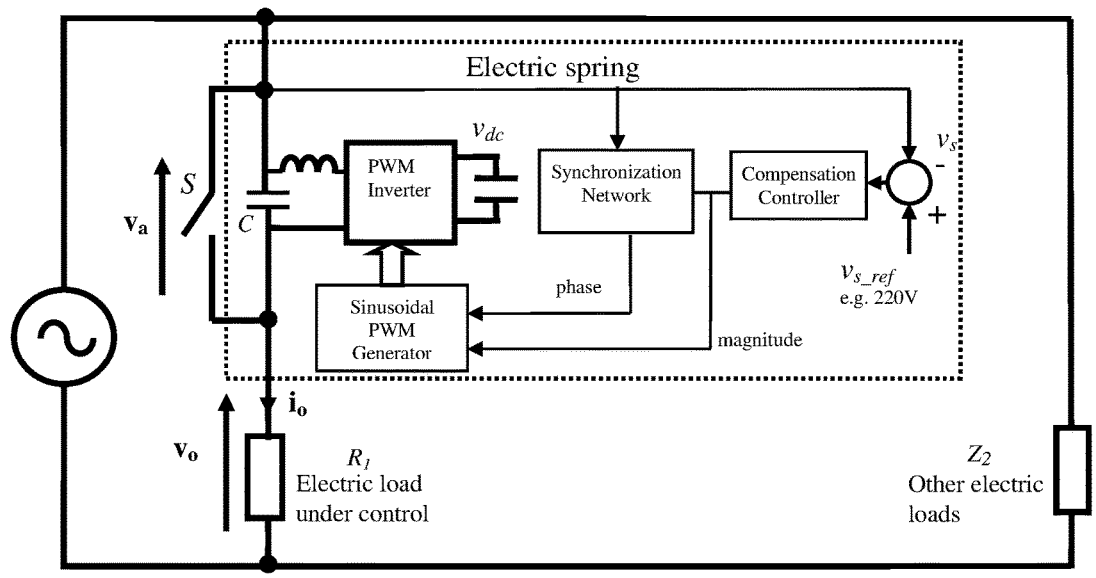
FIG. 1 is a schematic diagram of a prior AC/DC power converter connected in series to a non-critical load with output voltage control as described in [8]

Embodiments of the present invention provide a power controller 1 for an AC power converter 2 connected in series with a load 3 and receiving power from or delivering power to a power source 4. The power controller 1 comprises a radial control block 5 controlling a radial component of an electrical parameter of the AC power converter, and a chordal control block 6 controlling a chordal component of the electrical parameter of the AC power converter 2.

The electrical parameter can be one of: voltage, current, or power. However, other electrical parameters of interest can also be controlled by the power controller 1, such as for example, frequency.

The power controller 1 comprises a first input, a second input, and a third input. The first input is a magnitude of the electrical parameter of the power source 4. The second input is a desired magnitude of the radial component of the electrical parameter of the AC power converter 2. The third input is a desired difference between a phase angle of the electrical parameter of the power source 4 and a phase angle of the electrical parameter of the load 3.

In some embodiments where the electrical parameter is voltage, the radial control block 5 controls the radial component in accordance with EQ. (3) and (4) specified below. Furthermore, the chordal control block 6 controls the chordal component in accordance with EQ. (5) specified below.

The power controller 1 also comprises a summation block 10 which computes the vector sum of the radial and chordal components of the electrical parameter of the AC power converter 2 that is output by the radial and chordal control blocks 5 and 6 respectively to provide a reference magnitude and a reference phase angle for the electrical parameter of the AC power converter 2.

In one embodiment, the power source is a power grid and the power controller 1 controls the radial and chordal components of the electrical parameter of the AC power converter 2 in accordance with required values of one or more reference electrical parameters of the power grid. For example, the reference electrical parameters of the power grid can be grid voltage and/or grid line power factor.

The power controller 1 can also control the radial and chordal components of the electrical parameter of the AC power converter in accordance with required values of one or more reference electrical parameters of the load 3 or the power source 4. For example, the reference electrical parameters of the load, the smart load, or the power source can be one or more of the following: voltage, current, power, and power factor.

Importantly, the power controller controls the radial and chordal components of the electrical parameter of the AC power converter 2 to provide active and reactive power compensation to the power source 4.

The power controller 1 can be integrated with the AC power converter 2. The power controller 1 and the AC power converter 2 can also be integrated with the load 3. Whether or not the load is integrated with the power controller 1, the load together with the power controller 1 and the AC power converter 2 can be referred to as a "smart load".

Embodiments of the present invention can be used with a power source 4 in the form of a single phase or multi-phase AC power source.

Embodiments of the present invention also provide a power system comprising one or more loads 3 each connected in series to an AC power converter 2 each of which are controlled by a power controller 1 as described above.

Thus, it is appreciated that embodiments of the present invention are directed to methods and apparatuses for decomposing an AC power converter voltage in such a way that the power angle (or the arc-cosine of the displacement power factor) and the power amplitude (or apparent power) of a smart load can be controlled independently. It is appreciated that as well as voltage, other electrical parameters, such as current and power, of the AC power converter can be decomposed in a similar manner. The detailed mechanism of said methods and apparatuses is described further below. Throughout the present specification, the power controller 1 is also referred to as the "power controller block", or the "RCD controller", "RCD power controller", "RCD block", "RCD control block", "RCD power controller block", or "RCD algorithm block", where "RCD" stands for "radial-chordal decomposition". The radial control block 5 is also referred to as the "radial control algorithm block", and the chordal control block 6 is also referred to as the "chordal control algorithm block". The summation block 10 is also referred to as the "vector summer" or "vector summation block". The AC power converter 2 is also referred to as the "power converter", "converter", "AC/DC power converter", or "AC/DC converter".

As discussed above, a power electronic device known as an electric spring (ES), which is used in series connection with a non-critical load (such as thermal heaters) for active and reactive power compensation, has been invented [6]-[11]. Since then, various versions of the ES in the forms of an embedded load, an embedded power supply, and as a standalone ES, have been derived. Irrespective of the form of implementation, however, the basic functionality of an ES is to regulate the electrical parameters of a power network such that its line voltage and frequency are within predetermined operating limits. Embodiments of the present invention are directed to precisely controlling the electrical parameters of the power network independently and flexibly through the ES.

This is of prime importance to the widespread application of ESs. The electrical parameters of control interest include, but are not limited to, the power factor of the smart load, the power factor of the non-critical load, the power factor of the line supply, the apparent power of the smart load, the apparent power of the non-critical load, and the amplitude and frequency of the voltage of the power supply Importantly, embodiments of the present invention are also applicable to existing static synchronous series compensators (SSSC). For such existing compensators, reference can be made to the following articles:

[12] K. Sen, "SSSC-static synchronous series compensator: theory, modeling, and application," IEEE Transactions on Power Delivery, vol. 13, no. 1, pp. 241-246, January 1998; and

[13] L. Gyugyi et al., "Transmission line dynamic impedance compensation system," Mar. 30, 1993, U.S. Pat. No. 5,198,746, which is used in relation to medium-voltage or high-voltage flexible AC transmission systems or any related AC/DC power electronic converters requiring optimal and precise control of their line supply voltages or loads.

The control method of embodiments of the present invention is in the form of a transformation method called the radial-chordal decomposition (RCD) control method. This invention adopts a decomposition control scheme in such a way that the power amplitude and power angle of the smart load can be controlled independently with no effect on one another, which the traditional dq0-transformation and αβγ-transformation schemes cannot achieve.

Figure 8A:
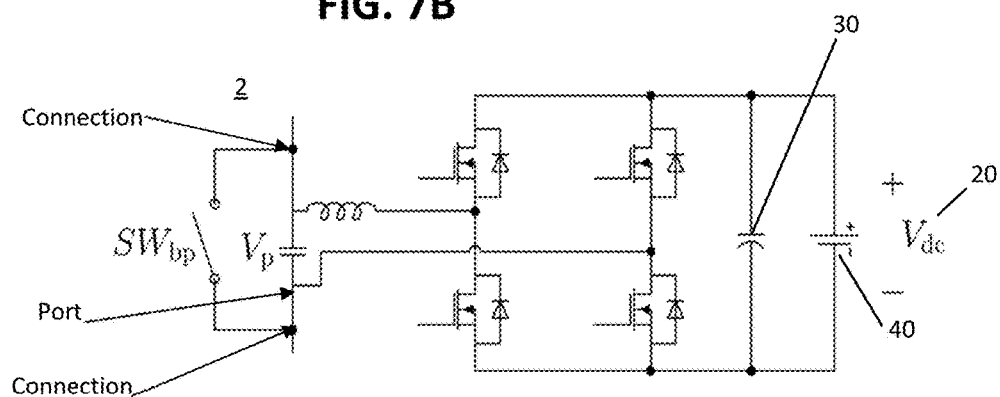
Figure 8B:
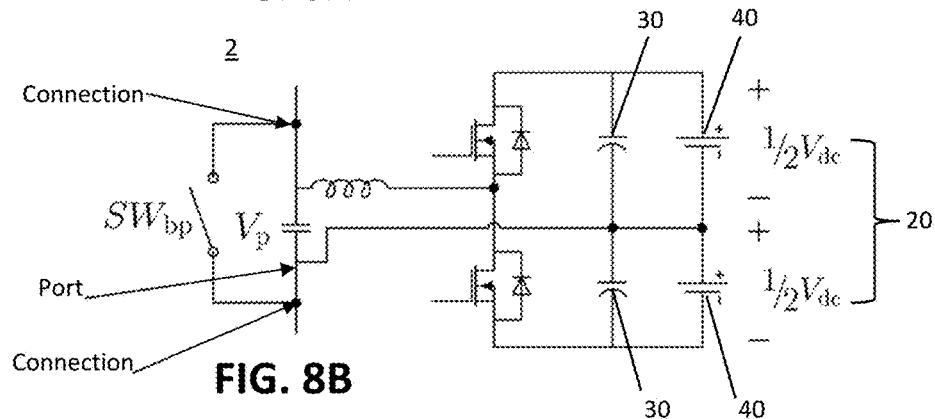

FIG. 1 shows a configuration of a prior series-connected ES (an AC/DC power converter) which is connected in series to a non-critical load with output voltage control [6]. In this configuration, the use of capacitors in the DC link of the inverter means that it can only provide reactive power compensation. Only reactive power control is used in this configuration. In the present invention, the DC link of the AC/DC power converter connects both capacitors and energy storages (such as batteries), as shown in FIG. 8, in such a way that (i) the AC power converter can provide active and reactive power compensations; (ii) the amount of active and reactive powers delivered to the power systems or absorbed by the AC power converter are managed by the RCD control method in accordance with embodiments of the present invention, such as in the form of power controller 1.

Figure 2:
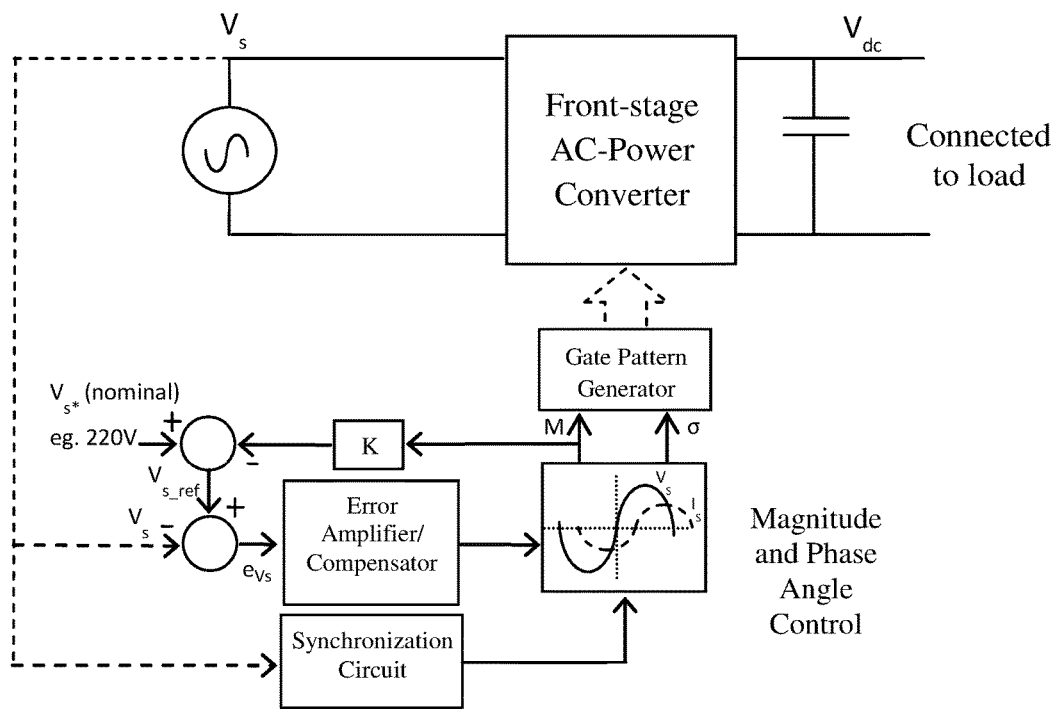
FIGS. 2, 3, and 4 are schematic diagrams of prior AC/DC converters connected in shunt to a load with input voltage control as described in [10]
Figure 3:
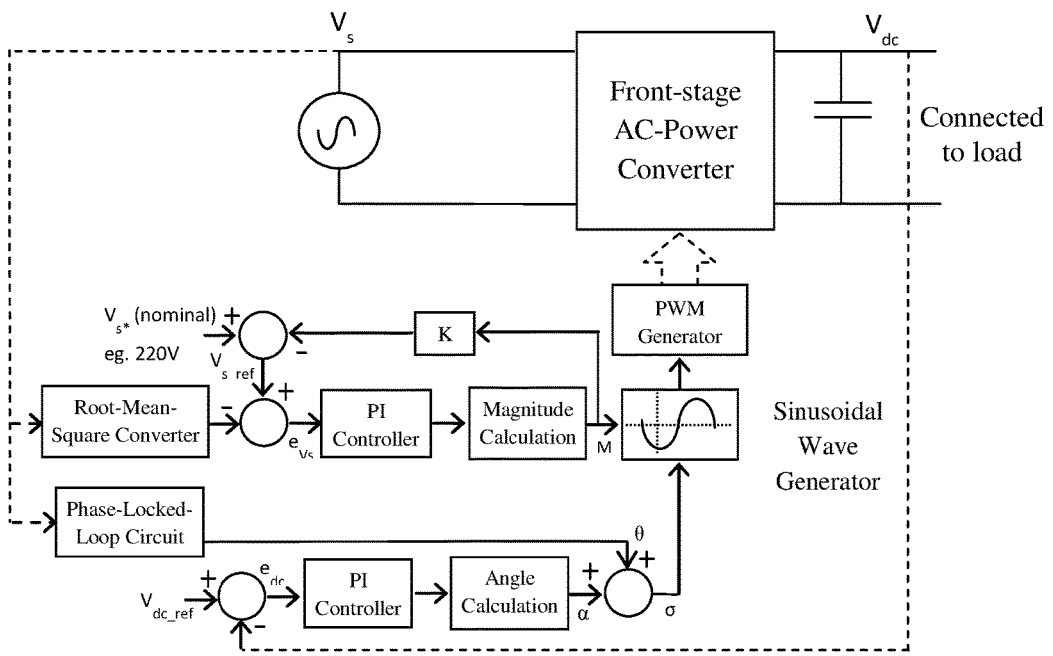
Figure 4:
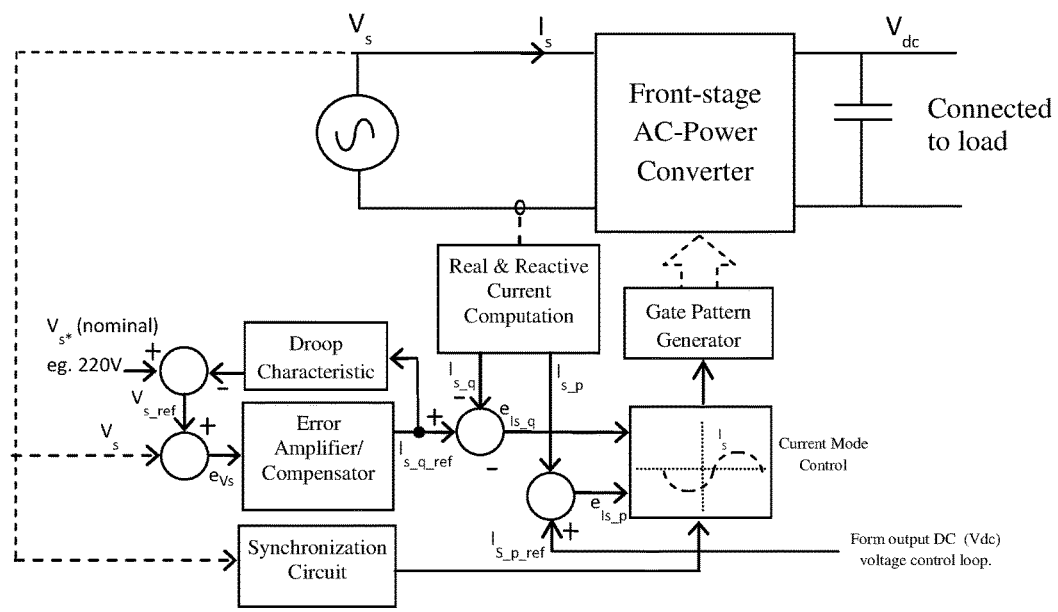

FIG. 2, FIG. 3 and FIG. 4 show three prior configurations where the AC/DC power converter is connected in shunt to a load and uses the input voltage control method [10]. In the present invention, the AC/DC power converter 2 is always connected in series to the load 3.

As shown in FIG. 2 and FIG. 3, the power magnitude and power angle processed by the AC/DC converter are independently controlled by a magnitude calculation block and an angle (or phase) calculation block, respectively. This simple control configuration cannot be used in the situation where the power converter is connected in series to a load. The RCD control block 1 in accordance with embodiments of the invention has to be used in order to control power magnitude and power angle independently without mutual effect on one another.

As shown in FIG. 4, the active and reactive powers processed by the AC/DC power converter can be controlled independently by defining a real and a reactive current reference from the real and reactive current computation blocks. By using the RCD control block 1 of embodiments of the invention, both active and reactive powers can be adjusted simultaneously, according to the RCD algorithm described in further detail below, by using the reference $V_{pr\_Ref}$ for radial control or $\theta_{o\_Ref}$ for chordal control independently.

Figure 5:
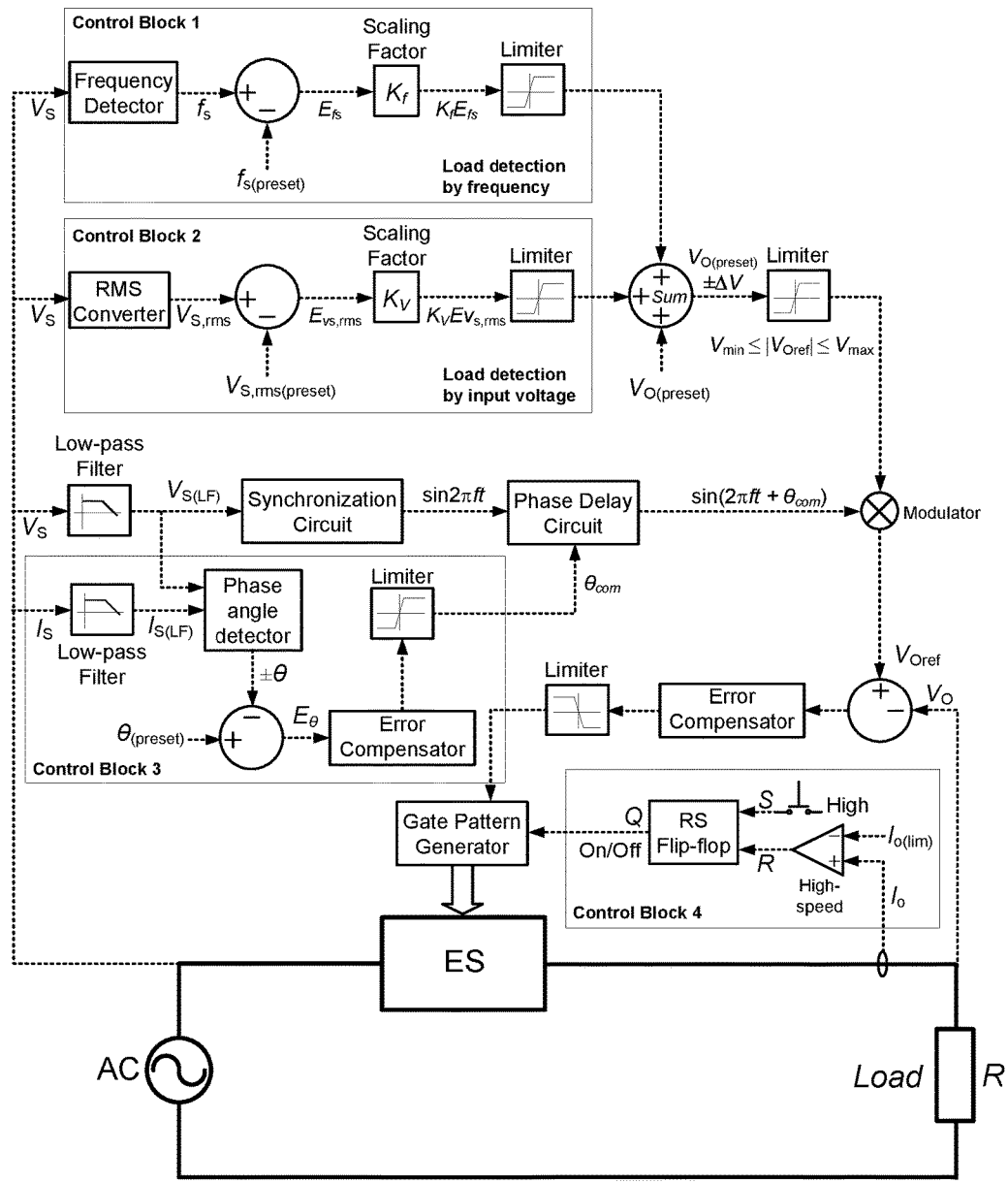
FIG. 5 is a schematic diagram of a prior controller for an AC/DC power converter connected in series to a load as described in [11]

As shown in FIG. 5, a controller for an AC/DC power converter connected in series to a load provides an adaptive function [11]. There is no means of managing the separation of the power angle control and the power amplitude control of the smart load, and hence they are mutually coupled.

Figure 6:
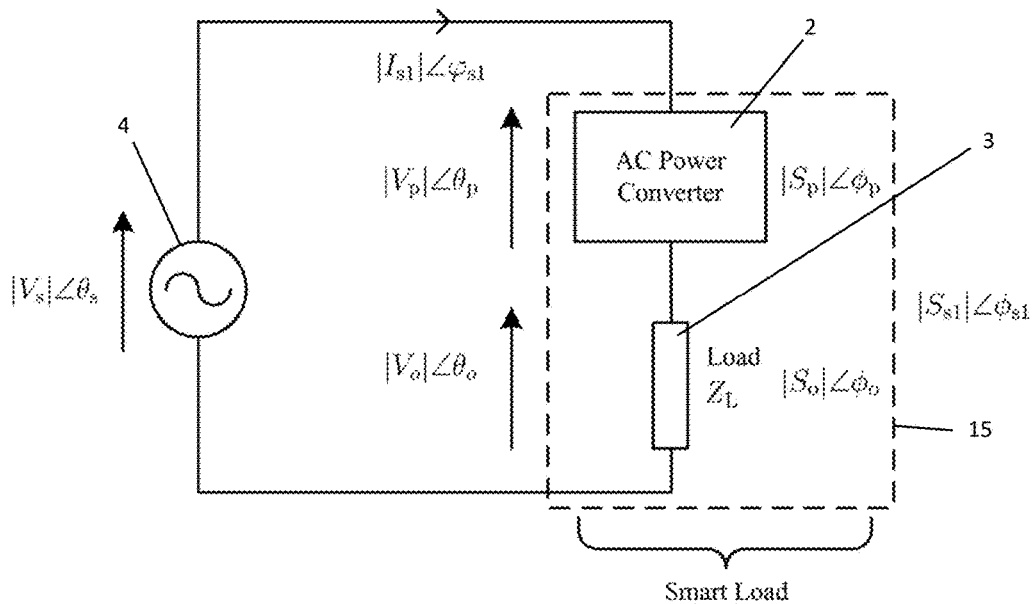
FIG. 6 is a schematic diagram of an illustrative electrical system in which an AC power converter is connected in series with a load to form a smart load, which is connected to an AC voltage source.

Referring to FIG. 6, an illustrative electrical system diagram is shown which consists of the AC power source 4 ($|V_s|\angle\theta_s$) and the AC power converter 2 connected in series to the load 3 ($|Z_L|\angle\phi_L=R_L+jX_L$). The potential difference across the power converter 2 is $|V_p|\angle\theta_p$ while that of the load 3 is $|V_o|\angle\theta_o$. In the above description and thereafter, all phasor angles denoted as $\theta$ and $\phi$ are referenced to the voltage phasor $|V_s|\angle 0$. All phasor angles denoted by $\phi$ are power angles representing the displacement angle between the described voltage and current phasors. The phasor magnitudes are represented in their root-mean-square (RMS) form.

The AC power converter 2 and the load 3 are combined together and are regarded as a smart load 15. Therefore, the vector sum of the complex powers of the AC power converter $|Z_p|\angle\phi_p=R_p+jX_p$ and that of the load $|Z_o|\angle\phi_o=R_o+jX_o$ is considered as the smart load complex power $|Z_{s1}|\angle\phi_{s1}=R_{s1}+jX_{s1}$, in which $|Z_{s1}|$ is the power amplitude (or the apparent power) of the smart load and $\phi_{s1}$ is the power angle (or the arc-cosine of the displacement power factor) of the smart load.

The relationship of the voltage of the power source 4, the voltage of the power converter 2 and the voltage of the load 3 is $$|V_s|\angle\theta_s = |V_p|\angle\theta_p + |V_o|\angle\theta_o \qquad \text{EQ. (1)}$$

Figure 7A:
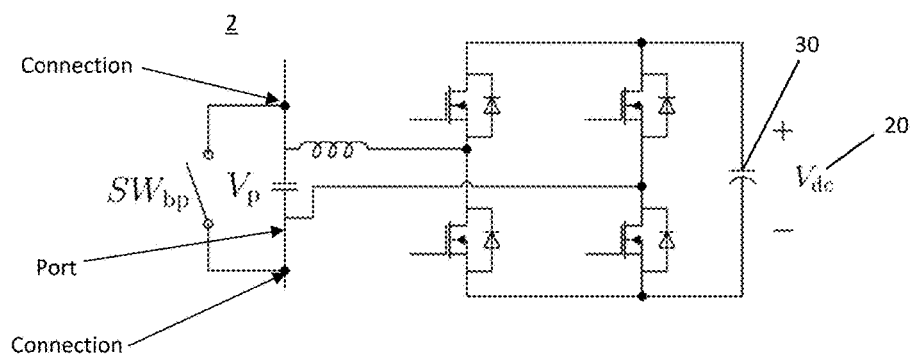
Figure 7B:
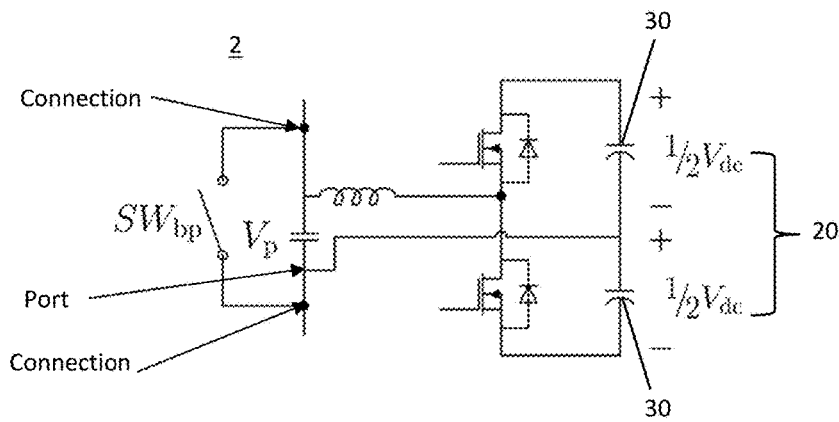

The AC power converter 2 is treated as an ideal AC power sink or source which can deliver (when it is a power source) or absorb (when it is a power sink) active and/or reactive power(s) to/from the power system. This power converter 2 can be implemented, but not limited to, by a half-bridge or a full-bridge bi-directional AC/DC power converter. The circuit diagrams are shown in FIG. 7 when it is required to handle only reactive power compensation and in FIG. 8 when it is required to handle both active and reactive power compensations. The DC link 20 shown in FIG. 7 consists of only capacitors 30 while that of FIG. 8 consists of both capacitors 30 and energy storages 40 such as batteries.

Figure 9A:
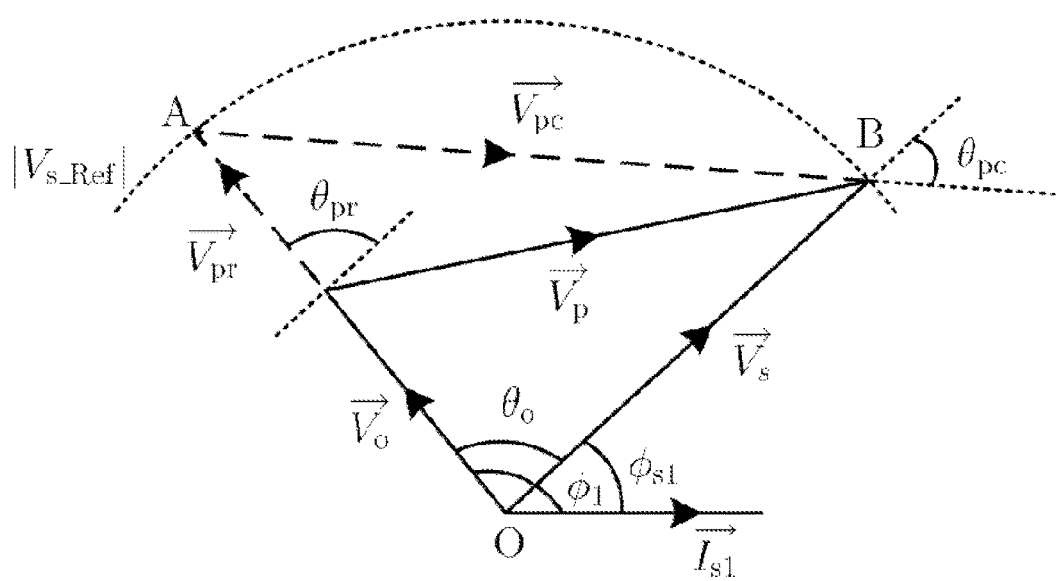
FIGS. 9A and 9B are schematic diagrams of two arbitrary states of the phasor voltages of EQ. (1), as described below, where the power converter voltage is decomposed into two components.
Figure 9B:
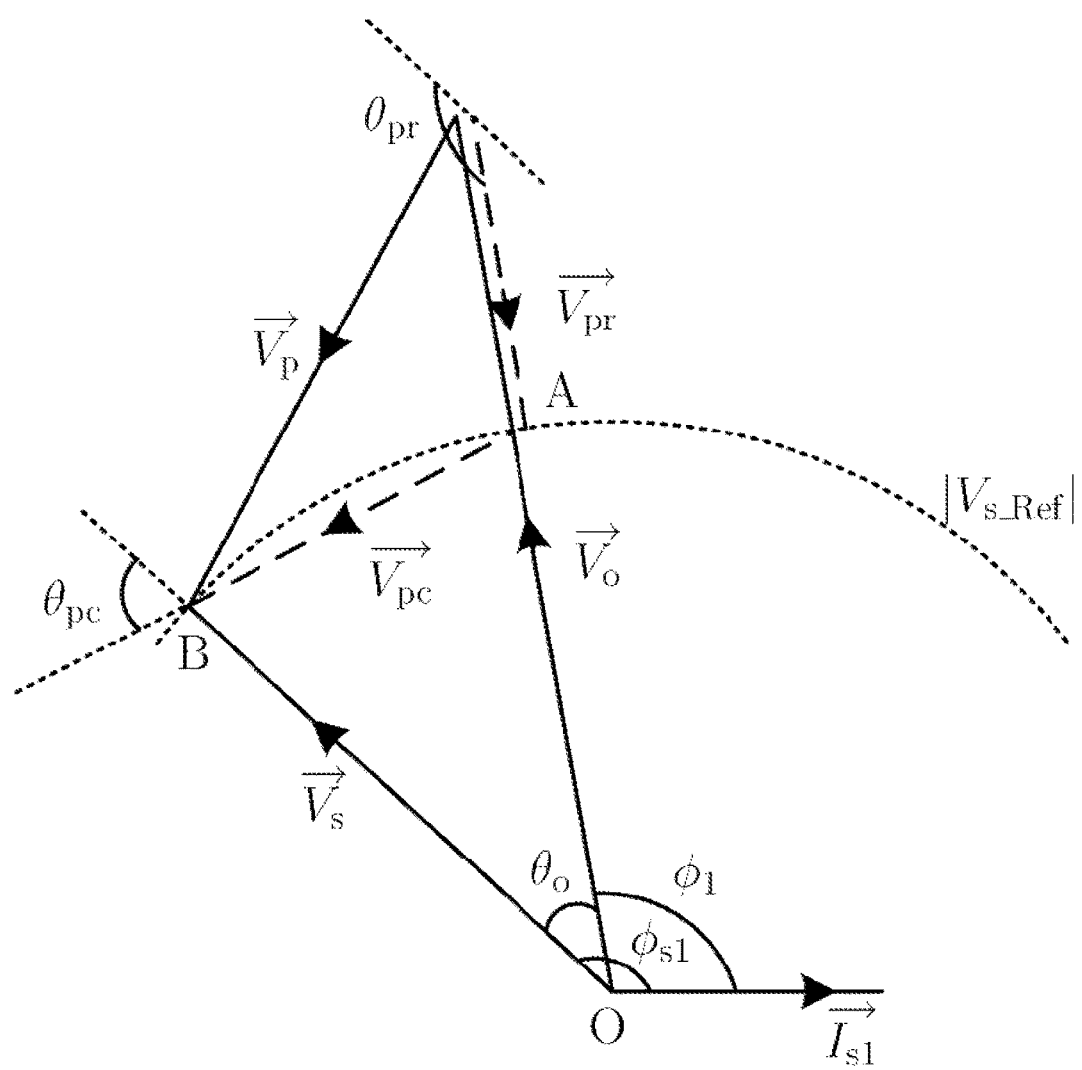

In the radial-chordal decomposition (RCD) method of embodiments of the present invention, the voltage of the power converter 2 is decomposed into two components. Two illustrative phasor diagrams are shown in FIG. 9A and FIG. 9B as examples. It is assumed that the power source voltage is maintained at a constant magnitude $|V_{s\_Ref}|\cdot|V_{pc}|$ and $|V_{pr}|$ are the magnitude of the two decomposed components, namely the chordal component and the radial component, respectively. Consequently, $\theta_{pc}$ and $\theta_{pr}$ are respectively the displacement angles of the two decomposed components, with reference to $|V_s|\angle 0$. With the presence of the power converter 2, the magnitude of the load voltage $|V_o|$ can be larger or smaller than that of the power source voltage $|V_s|$. Also, the voltage phasor $|V_o|\angle\theta_o$ can either lead or lag the voltage phasor $|V_s|\angle\theta_s$. Hence, $$|V_p|\angle\theta_p = |V_{pc}|\angle\theta_{pc} + |V_{pr}|\angle\theta_{pr}. \qquad \text{EQ. (2)}$$

In this decomposition arrangement, the radial component $|V_{pr}|\angle\theta_{pr}$ is either in phase (as shown in FIG. 9A) or anti-phase (as shown in FIG. 9B) with the non-critical load voltage $|V_o|\angle\theta_o$ such that the equations for $|V_{pr}|\angle\theta_{pr}$ are $$\theta_{pr} = \begin{cases} \theta_o & \text{for } |V_o| < |V_s| \\ 0 & \text{for } |V_o| = |V_s| \text{ (No radial-component)} \\ \theta_o - \pi & \text{for } |V_o| > |V_s| \end{cases} \qquad \text{EQ. (3)}$$

and $$|V_{pr}| = ||V_o| - |V_s||. \qquad \text{EQ. (4)}$$

Considering the chordal component, as shown in FIG. 9A, the voltage phasor $|V_o|\angle\theta_o$ is leading the reference voltage phasor $|V_s|\angle 0$ while the voltage phasor $|V_{pc}|\angle\theta_{pc}$ is lagging the reference voltage phasor $|V_s|\angle 0$. On the other hand, as shown in FIG. 9B, the voltage phasor $|V_o|\angle\theta_o$ is lagging while the voltage phasor $|V_{pc}|\angle\theta_{pc}$ is leading the reference voltage phasor $|V_s|\angle 0$. The absolute value of the angle $\theta_{pc}$ can be evaluated by considering the sum of the inner angles of the isosceles triangle OAB indicated in FIG. 9A or FIG. 9B. The magnitude of the chordal-component voltage can be found by considering the cosine rule on the isosceles triangle. Hence, two functions, $f_{\theta-chordal}(\theta_o)$ and $f_{V-chordal}(\theta_o)$, can be derived. We have $$\begin{cases} \theta_{pc} = f_{\theta-chordal}(\theta_o) = -\text{sgn}(\theta_o) \cdot \dfrac{\pi - |\theta_o|}{2} \\ |V_{pc}| = f_{V-chordal}(\theta_o) = \sqrt{2|V_s|^2(1-\cos\theta_o)} \end{cases} \text{for } -\pi < \theta_o < \pi. \qquad \text{EQ. (5)}$$

where sgn(.) is defined as the sign function. Therefore, the chordal-component voltage phasor is generated in accordance with the phasor angle of the non-critical load voltage $\theta_o$ with reference to the reference voltage phasor $|V_s|\angle 0$.

The complex power of the smart load can be represented by $$|S_{s1}|\angle\phi_{s1} = \frac{|V_{s\_Ref}|(|V_{s\_Ref}| - V_{pr})}{|Z_1|}\angle(\phi_1 - \theta_o), \qquad \text{EQ. (6)}$$

where $V_{pr}$ is the voltage level of the radial component defined as $$V_{pr} = \begin{cases} V_{pr} & \text{for } |V_o| < |V_s| \\ 0 & \text{for } |V_o| = |V_s| \text{ (No radial-component)}. \\ -|V_{pr}| & \text{for } |V_o| > |V_s| \end{cases} \qquad \text{EQ. (7)}$$

Figure 21A:
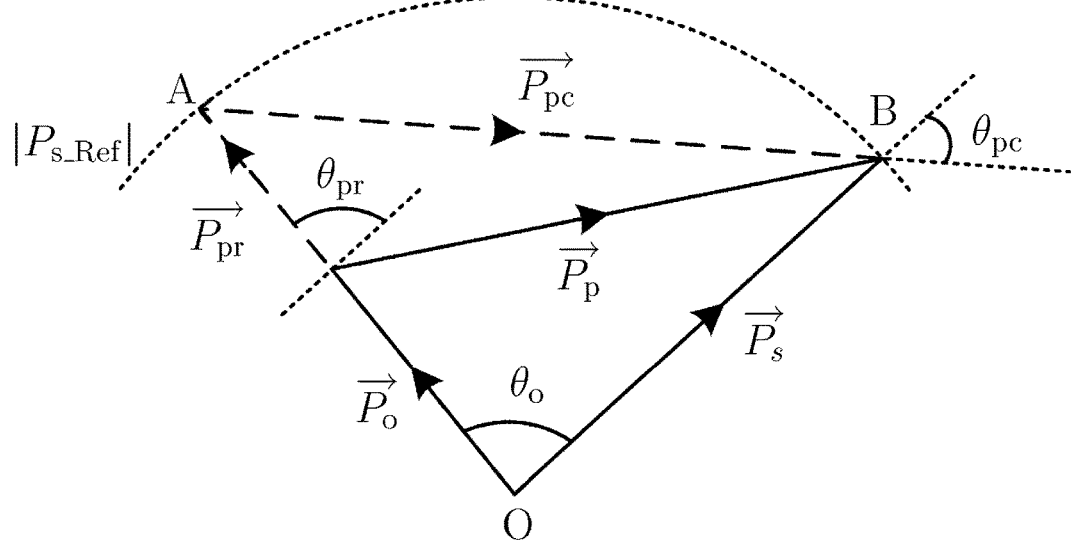
FIGS. 21A and 21B are schematic diagrams of two arbitrary states of the phasor powers in accordance with an equivalent of EQ. (1), as described below, but in respect of the electrical parameter of power, where the power converter power is decomposed into two components.
Figure 21B:
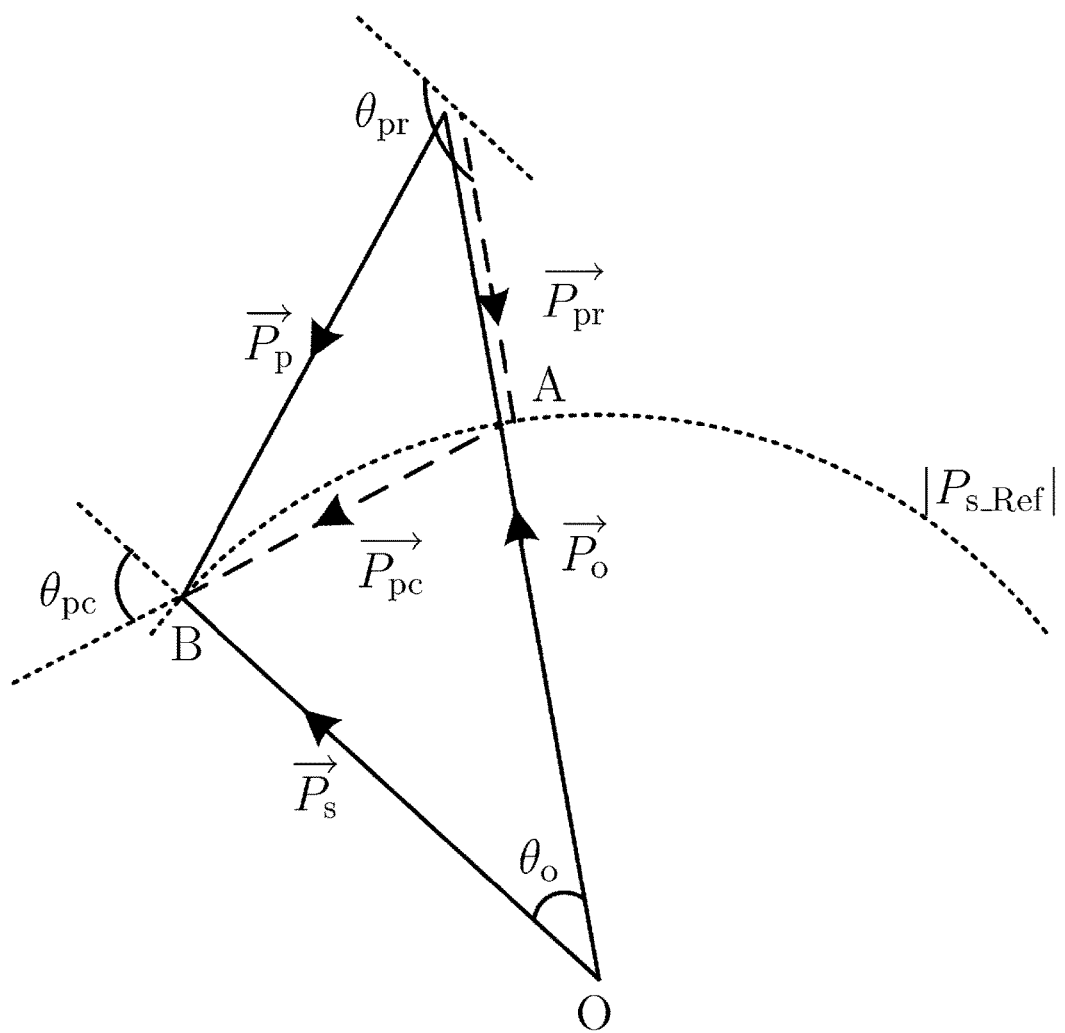
Figure 22A:
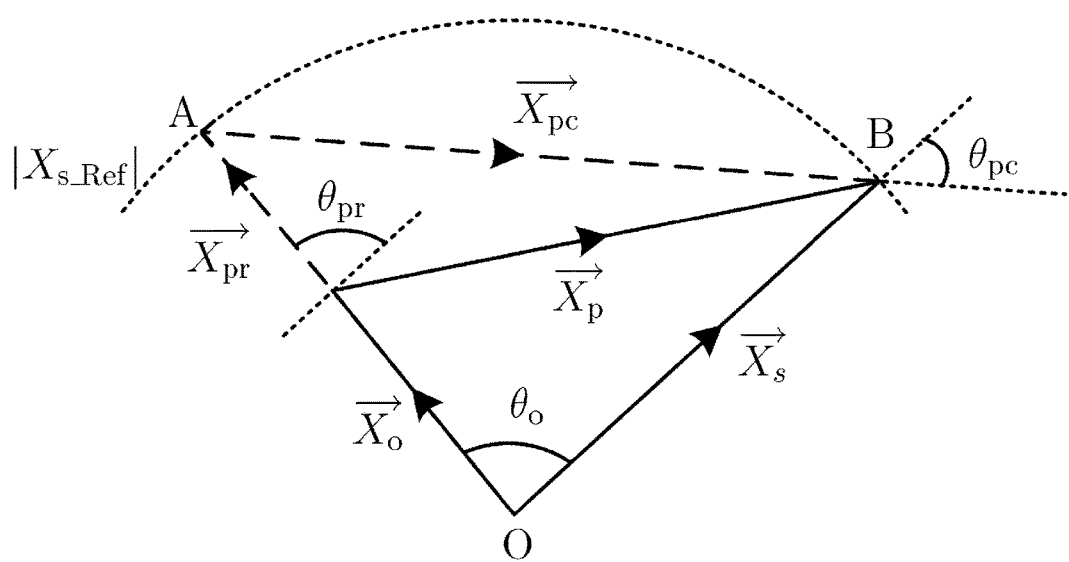
FIGS. 22A and 22B are schematic diagrams of two arbitrary states of the phasors of an electrical parameter X in accordance with an equivalent of EQ. (1), as described below, but in respect of the electrical parameter X, where the electrical parameter X of the power converter is decomposed into two components.
Figure 22B:
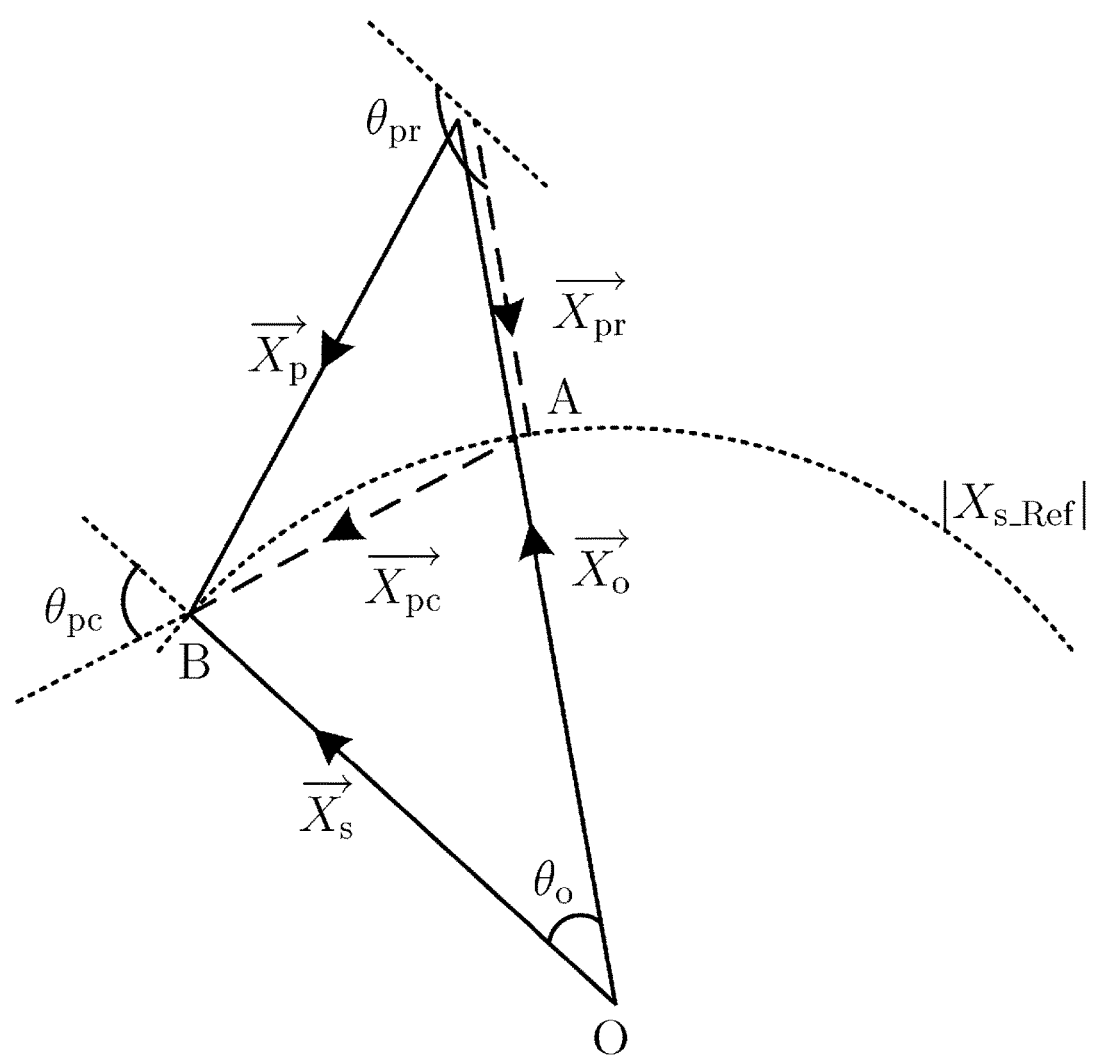

Although it is the electrical parameter of voltage that is considered in the analysis above, similar equations can be derived for other electrical parameters, such as current and power. In this regard, and similar to the voltage phasor diagrams shown in FIG. 9A and FIG. 9B, FIG. 20A and FIG. 20B show phasor diagrams for the electrical parameter of current, and FIG. 21A and FIG. 21B show phasor diagrams for the electrical parameter of power. For the general case, FIG. 22A and FIG. 22B show phasor diagrams for an electrical parameter X.

Figure 10:
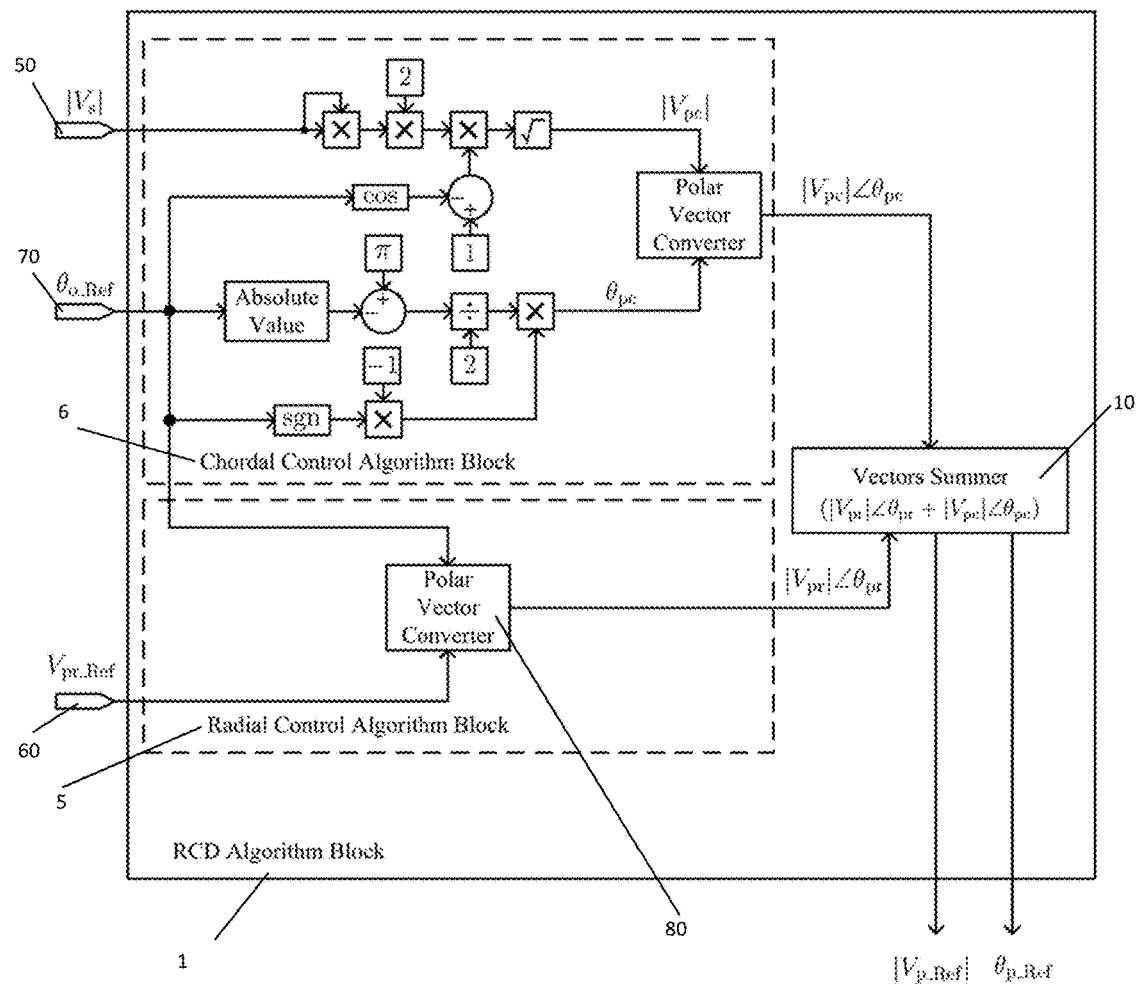
FIG. 10 is an algorithmic diagram of a RCD power controller block in accordance with an embodiment of the present invention.

A diagram showing a possible method of implementing the RCD control method is shown in FIG. 10. The RCD Algorithm Block 1 consists of a radial control algorithm block 5, a chordal control algorithm block 6 and a vector summation block 10. There are three input signals required: (i) the magnitude of the power source voltage $|V_s|$ 50, (ii) the desired reference value of the magnitude of the radial-component voltage of the power converter $V_{pr\_Ref}$ and 60 (iii) the desired reference value of the phase angle between the power source voltage and the load voltage $\theta_{o\_Ref}$ 70. The radial control algorithm block 5 is constructed according to EQ. (3) and EQ. (4). Since the value of $V_{pr\_Ref}$ can be either positive (meaning $|V_o|\angle|V_s|$) or negative (meaning $|V_o|>|V_s|$) such that $|V_{pr}|\angle\theta_{pr}$ can be equal to $|V_{pr\_Ref}|\angle\theta_{o\_Ref}$ or $|V_{pr\_Ref}|\angle\theta_{o\_Ref}$ (equivalent to $|V_{pr\_Ref}|\angle(\theta_{o\_Ref}-\pi)$). This calculation is executed inside the polar vector converter 80. The chordal control algorithm block 6 is constructed according to EQ. (5). This block calculates the chordal-component voltage $|V_{pc}|\angle\theta_{pc}$. The radial- and chordal-component voltages are then combined using the vector summation block 10 given in EQ. (2) to give the reference magnitude $|V_{p\_Ref}|$ and a reference phase angle $\theta_{p\_Ref}$ of the power converter output voltage.

FIG. 10 shows an approach of implementing the algorithm of the RCD control method. The actual implementation can use either digital processors (like digital signal processor (DSP) controllers) or analog circuits (like analog voltage adders or multipliers). Furthermore, the control method should be cooperated with other functional blocks such as the phase-locked loop, synchronization block, sinusoidal-pulse-width-modulation (SPWM) gate pattern generator, etc, for the overall functional control of the system.

Figure 11:
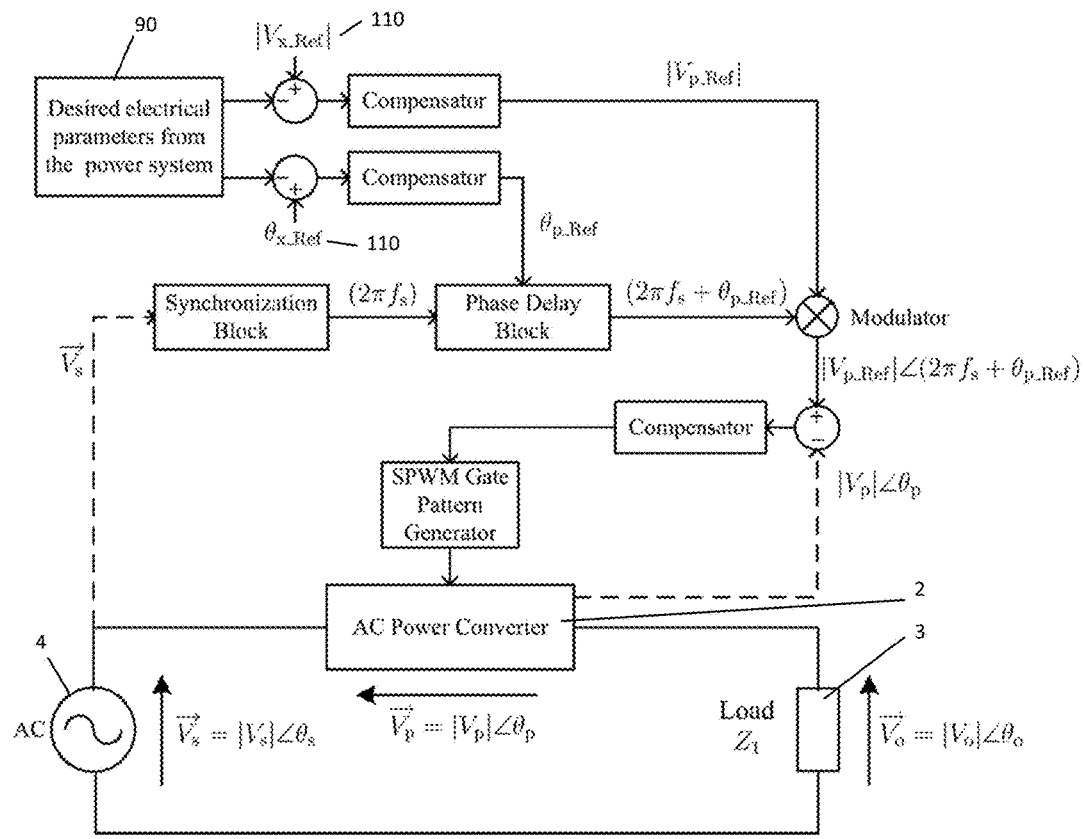
FIG. 11 is a schematic diagram of a generalized controller for an AC/DC power converter connected in series to a load.
Figure 12:
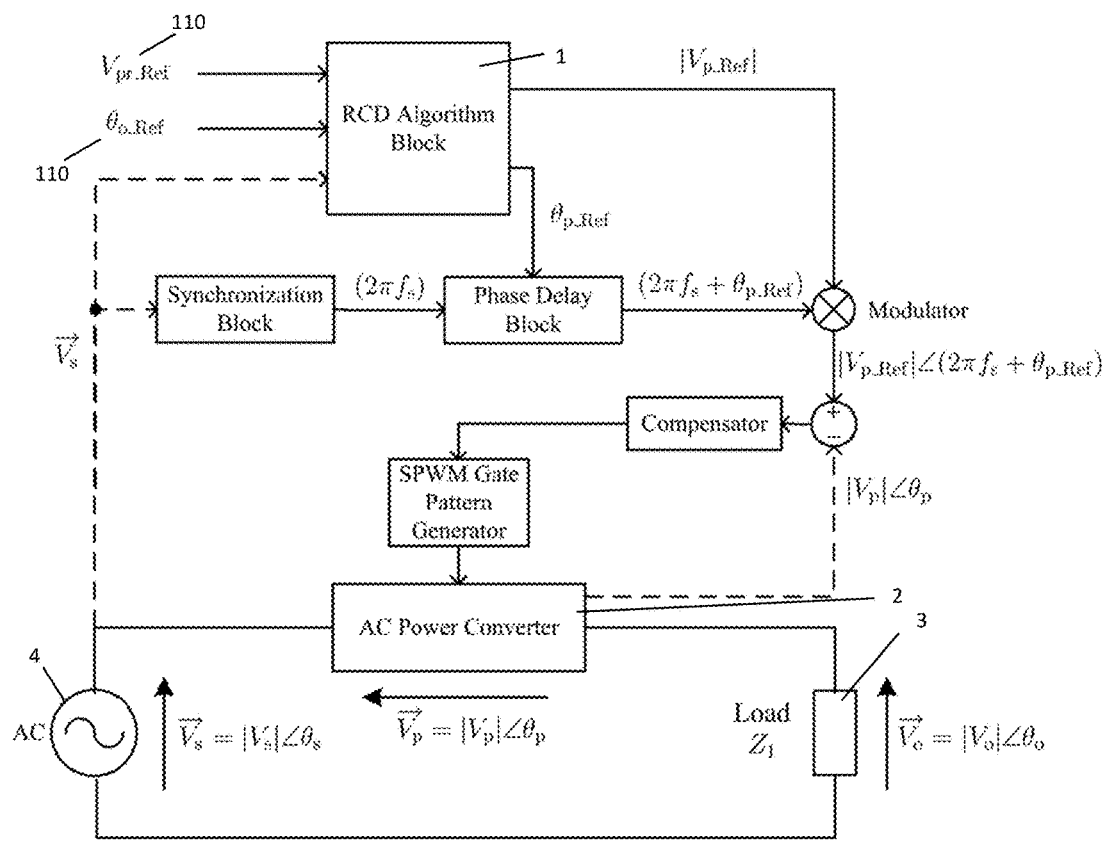
FIG. 12 is a schematic diagram of a generalized controller with an RCD power controller block in accordance with an embodiment of the present invention for an AC/DC power converter connected in series to a load.
Figure 13A:
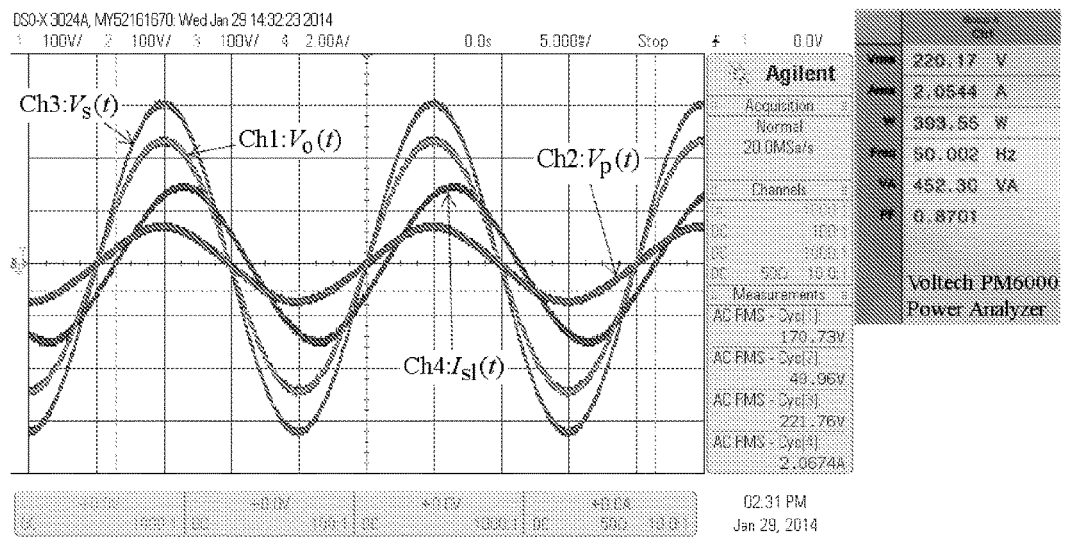
Figure 13B:
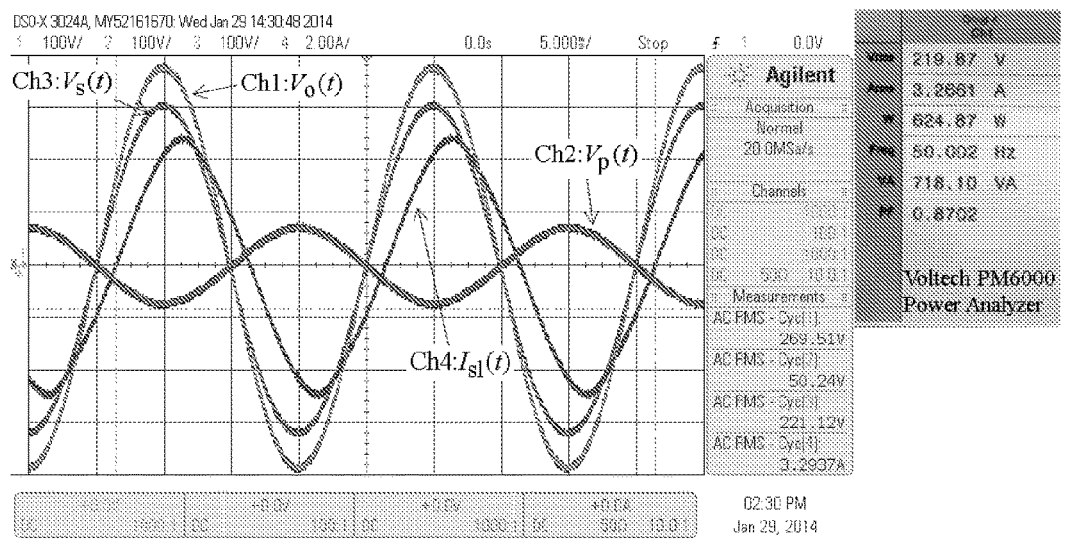
Figure 13C:
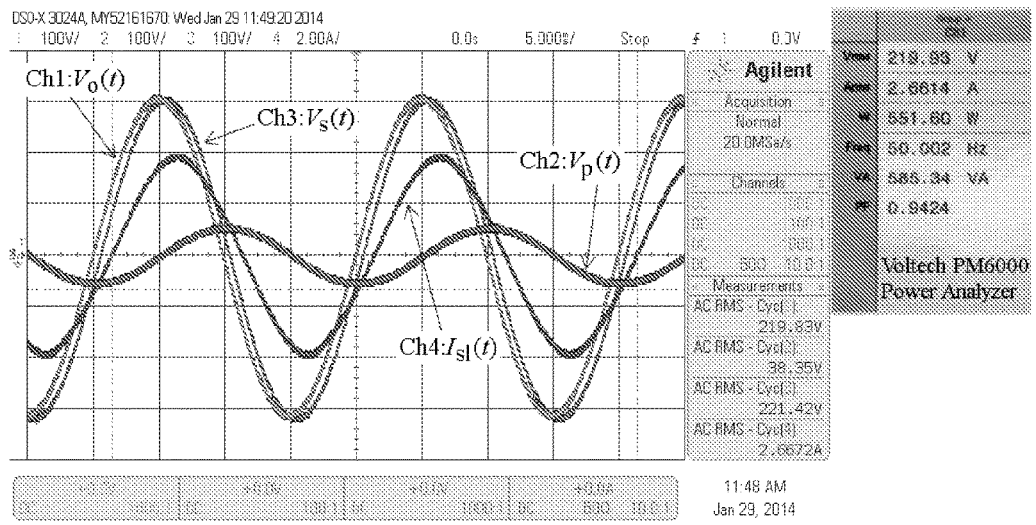
Figure 13D:
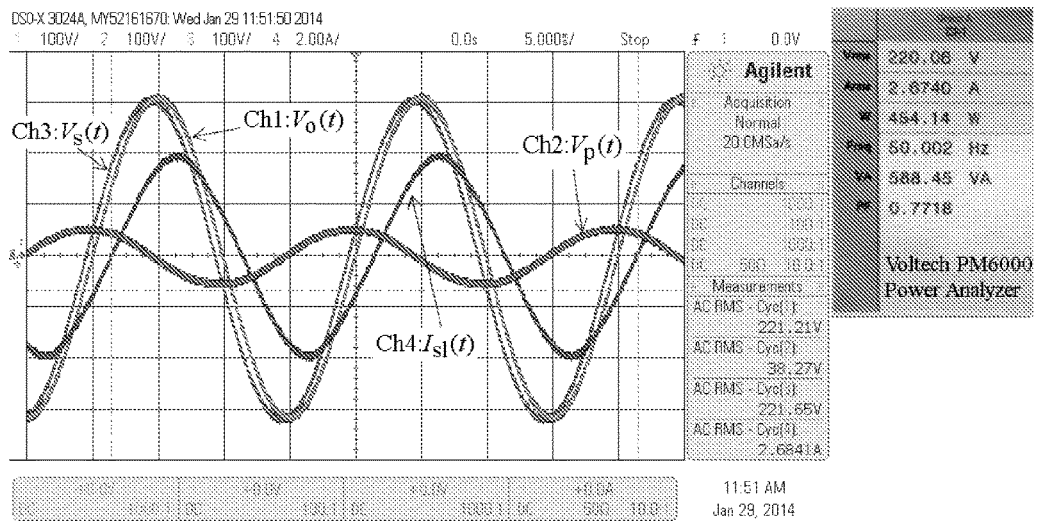
Figure 13E:
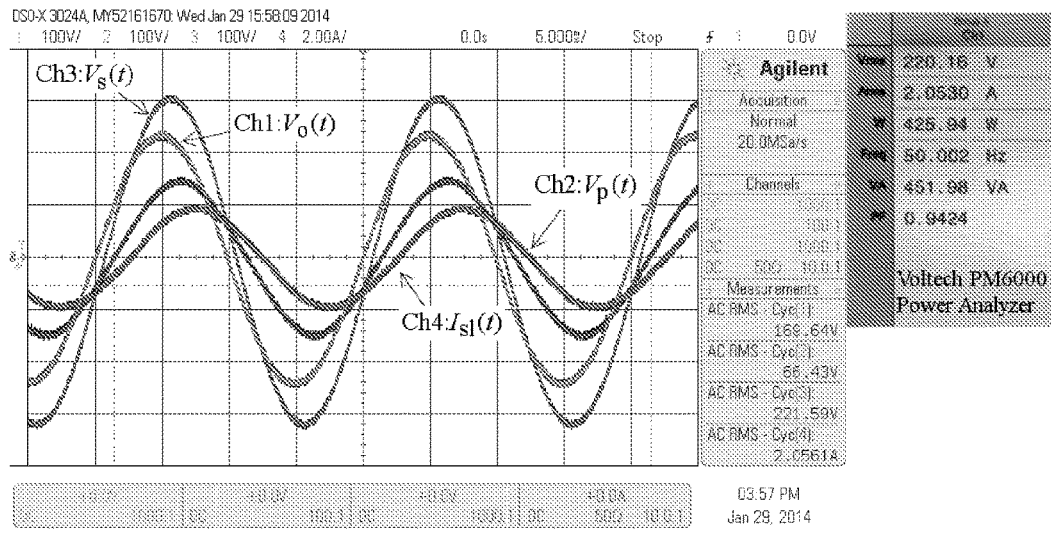
Figure 13F:
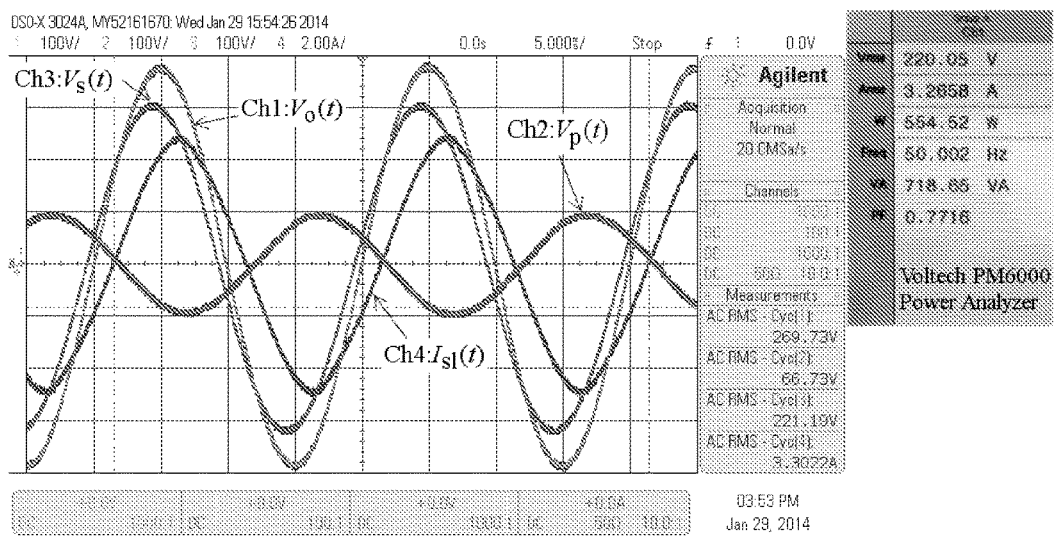

FIG. 11 shows a general form of existing controllers used for output voltage control of existing ES systems with an AC/DC power converter, which is connected in series to a load. Desired electrical signals 90 from the power system are fed into the controller and compared with desired references 110 $|V_{x\_Ref}|$ or $\theta_{x\_Ref}$ so that two reference signals for the power supply output voltage, $|V_{p\_Ref}|$ and $\theta_{p\_Ref}$ can be obtained. An example of this implementation can be found in [11], where the power angle of the smart load, the grid voltage and the grid frequency are the electrical parameters fed to the controller. In this control design, there is no management on the separation of the power angle and the power amplitude of the smart load and hence they are mutually coupled. With the inclusion of the RCD Algorithm Block 1 as shown in FIG. 12, the decomposition of the power angle and power amplitude of the smart load is handled by the RCD Algorithm Block 1. As a result, the adjustment of the power angle of the smart load will not affect the power magnitude of the smart load, and vice versa.

Experimental waveforms are given in FIG. 13 to illustrate the functionality of the RCD control method in different modes of operation. The experiment is based on the system given in FIG. 12. The load $Z_1$ is $(72+j40.7)$ Ω and the AC power source voltage $|V_s|$ is 220 V.

In future power systems, a large portion of the power sources will be based on renewable energy sources such as wind and solar. The distributed and intermittent nature of the renewable energy sources can easily cause instability in the grid voltage as power demand and supply cannot be easily balanced without the inclusion of new control solutions or storages. AC power converters controlled by the RCD power controller and the control method in accordance with embodiments of the present invention are a solution to this problem. In such a configuration, the power amplitude of smart loads will follow the supply side power fluctuation through the radial-control while the power factor of the smart loads are controlled using the chordal-control.

Figure 15:
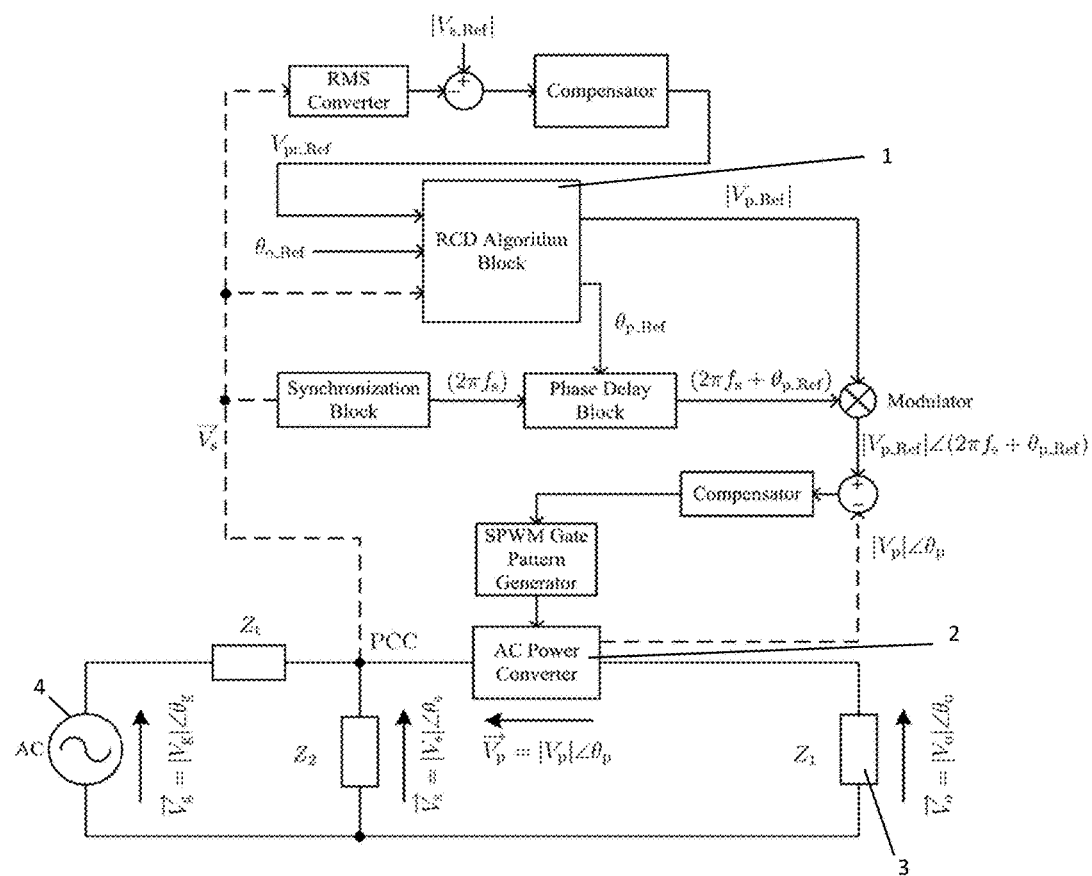
FIG. 15 is a schematic diagram of a power grid with an AC power converter connected to a load in series for achieving grid-voltage regulation and power angle adjustment using a RCD power controller block in accordance with an embodiment of the invention.
Figure 16:
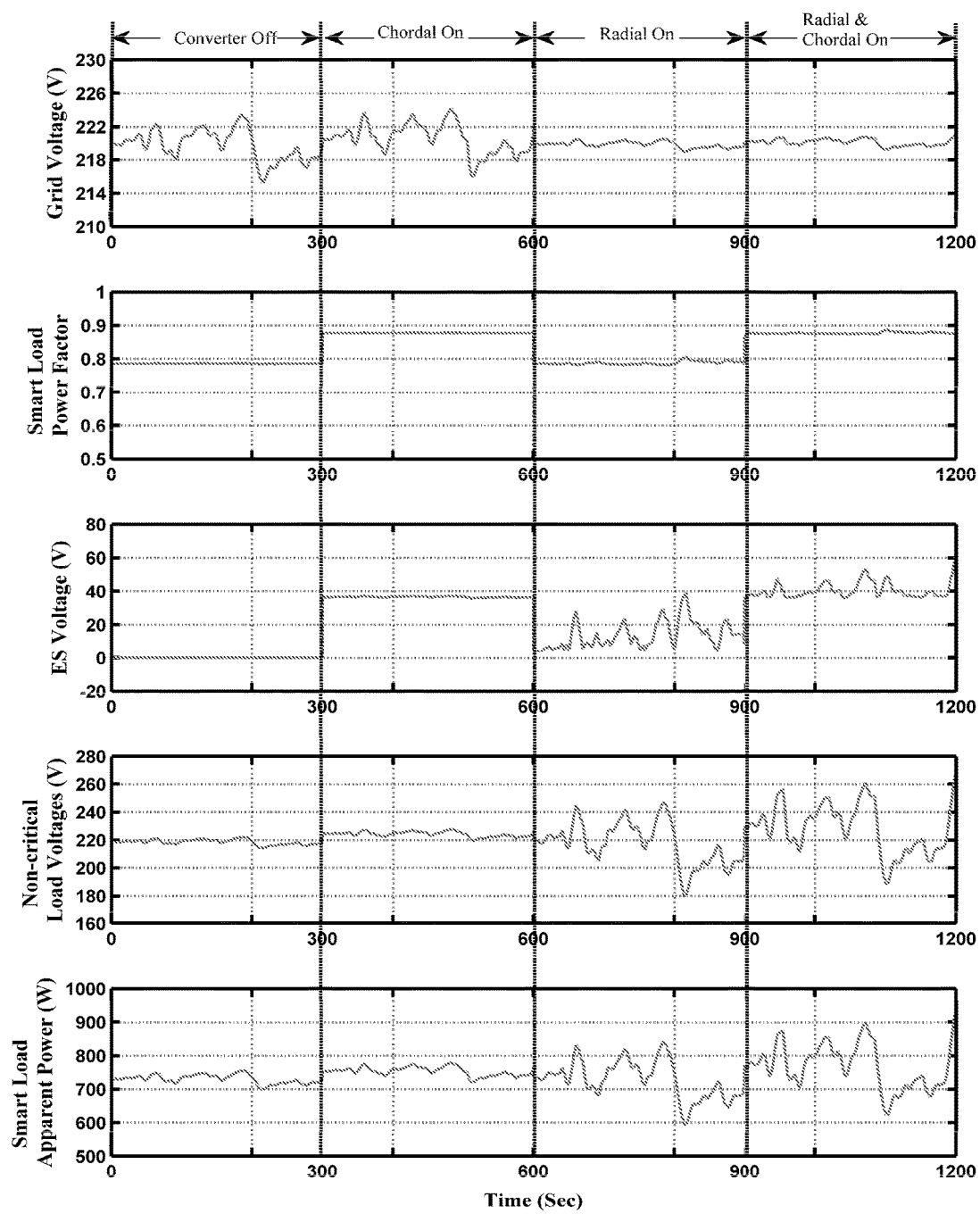
FIG. 16 shows graphs of experimental waveforms of the power grid of FIG. 15 with a randomly time-varying supply side voltage.

A schematic of a power grid with an AC power converter 2 and series load 3 capable of performing grid voltage regulation and power angle adjustment using the RCD power controller 1 is illustrated in FIG. 15. Here, $\vec{V_s}$ represents the grid voltage at a certain point-of-common-coupling (PCC) and $Z_t$ is the impedance of the power transmission cable. FIG. 16 shows graphs of experimental waveforms of the power grid of FIG. 15 with a randomly time-varying supply side voltage. From t=0 to 300 s, the AC power converter 2 is turned off. From t=300 to 600 s, the AC power converter 2 is turned on with the chordal control. From t=600 to 900 s, the AC power converter 2 is turned on with the radial control. From t=900 to 1200 s, the AC power converter 2 is turned on with both the chordal and radial control.

Figure 14:
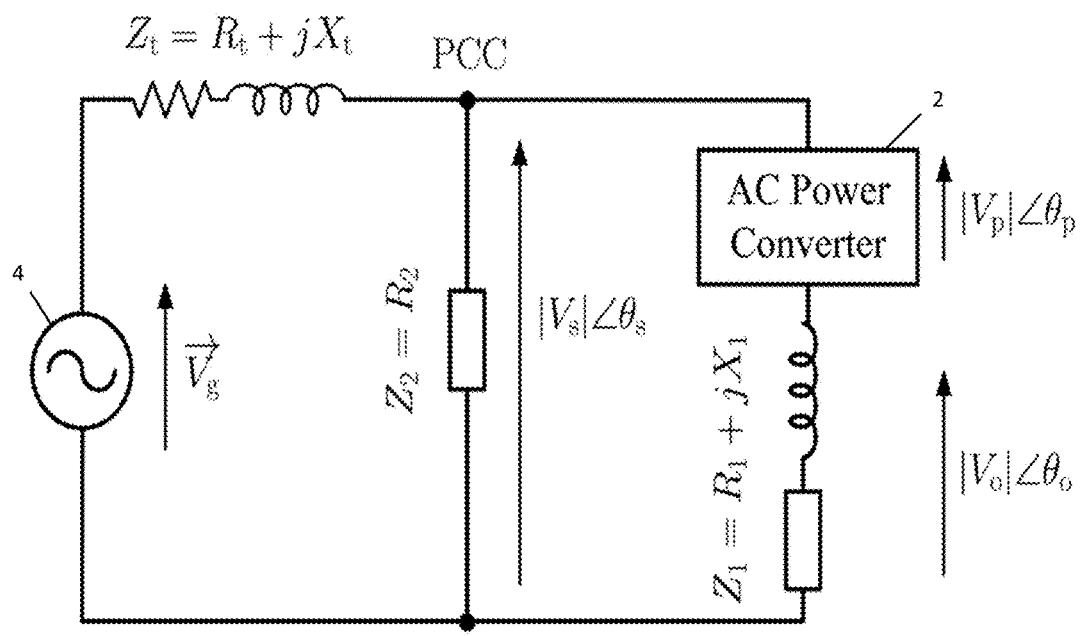
FIG. 14 is a schematic diagram of an experimental electrical system with a time varying supply side voltage $\vec{V}_g$.

The control schematic is identical to that shown in FIG. 12, except that the radial control reference voltage, $V_{pr\_Ref}$, is generated by a closed-loop circuit for regulating the grid voltage. An RMS converter is adopted to obtain the RMS value of the grid voltage that is being compared to a grid voltage reference value $V_{s\_Ref}$ for performing grid voltage regulation. The configuration of the experimental power system is shown in FIG. 14. The transmission line impedance is chosen to be $Z_t=(2+j6.28)$ Ω. The critical load resistance is chosen to be $Z_2=76.90$Ω, which consumes a nominal real power of 629.39 W at $|V_s|=220$ V. In order to realize the displacement power factor correction ability of the chordal control, an inductive load with an impedance of $Z_1=(51.73+j40.72)$ Ω is used, which consumes a nominal real power of 577.68 W at $|V_s|=220$ V. The objective of this experiment is to validate that the chordal component can be used for improving the power factor of this power system while the radial component can be used to regulate the grid voltage.

The nominal supply side voltage is found by $$|V_g|_{nom} = |V_{s\_Ref}| \cdot \frac{|Z_1 \angle \phi_1 \,//\, Z_2 \angle \phi_2) + Z_t \angle \phi_t|}{|Z_1 \angle \phi_1 \,//\, Z_2 \angle \phi_2|} \qquad \text{EQ. (8)}$$

which gives a nominal supply side voltage of 245.8 V in the example.

The supply side voltage fluctuations, simulating the situation of a future power grid system with a high penetration of intermittence power sources installed, is emulated by a random voltage source $\Delta V_g$ where the magnitude randomly changes from −5 V to 5 V, such that the magnitude of the supply side voltage will vary randomly and is given as $$|V_g| = |V_g|_{nom} + \Delta V_g. \qquad \text{EQ. (9)}$$

The experiment is divided into four phases. In the first phase, for the period t=0 to 300 s, the AC power converter 2 is turned off by closing the by-pass switch $SW_{bp}$ shown in FIG. 7 and FIG. 8. In the second phase, t=300 to 600 s, the AC power converter 2 with only the chordal control is turned on with a reference angle $\theta_{o\_Ref}=10°$. In the third phase, t=600 to 900 s, the AC power converter 2 with only the radial control is turned on with a grid reference voltage $|V_{s\_Ref}|=220$ V. Finally, in the fourth phase, t=900 to 1200 s, both the chordal and radial control are applied to the system. The reference angle $\theta_{o\_Ref}$ is set to 10° while the grid reference voltage is set to 220 V.

The experimental results are shown in FIG. 16. As illustrated, during t=0 to 300 s, when the AC power converter is turned off, the grid voltage $\vec{V_s}$ is unregulated and the power factor of the smart load is around $$\cos(\phi_1) = \cos\left[\arctan\left(\frac{40.72}{51.73}\right)\right] = \cos(38.2°) = 0.786. \qquad \text{EQ. (10)}$$

From t=300 to 600 s, the chordal AC power converter is turned on. The grid voltage $\vec{V_s}$ is still kept unregulated but the power angle of the smart load has been decreased by 10° with the increased power factor of the smart load, according to EQ. (7), being measured as around $$\cos(\phi_1') = \cos(\phi_1 - \theta_o) = \cos(38.2° - 10°) = 0.881. \qquad \text{EQ. (11)}$$

From t=600 to 900 s, the AC power converter 2 is turned on with the radial control. The grid voltage is regulated at 220 V. Since the phase of the radial-component voltage is either in-phase or anti-phase with the non-critical load voltage, the power factor of the smart load will not be affected and is maintained at 0.786. From t=900 to 1200 s, the AC power converter 2 is turned on with the application of both the radial and chordal control. Both the power factor improvement and grid voltage regulation are performed simultaneously. The power factor of the smart load can be improved to 0.881 while the grid voltage can be regulated at around 220 V.

It can be observed that from t=600 to 1200 s, the smart load apparent power is kept changing along with the fluctuation of the supply side voltage in such a way that load shedding or boosting can be achieved. Furthermore, from t=300 to 600 s and t=900 to 1200 s, the power factor of the smart load can improved from 0.786 to 0.881. As a result, the grid voltage regulation process can be done by using radial control while the power quality of this power transmission system will not be affected by the grid-voltage regulation process using chordal control.

Figure 17:
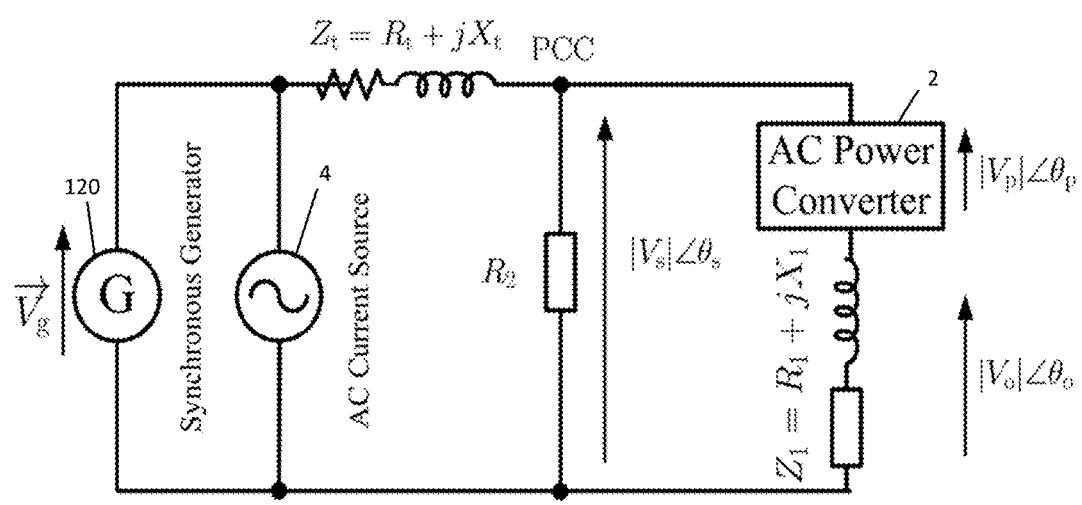
FIG. 17 is a schematic diagram of an electrical system for the simulation of a synchronous generator model and a renewable energy source.

The following example verifies the application of the RCD power controller 1 on grid-frequency regulation of power grids. PSIM software was used in this simulation. The power system schematic is shown in FIG. 17. In real-life power grids, the supply side is installed with synchronous generators for supplying electricity. The frequency is regulated by a governor. In this simulation, a synchronous generator 120 model is used. The torque supply to the generator is dependent on the amount of power the generator generates. A random AC current source, connected to the generator in parallel, is used to emulate an intermittence renewable energy source.

Figure 18:
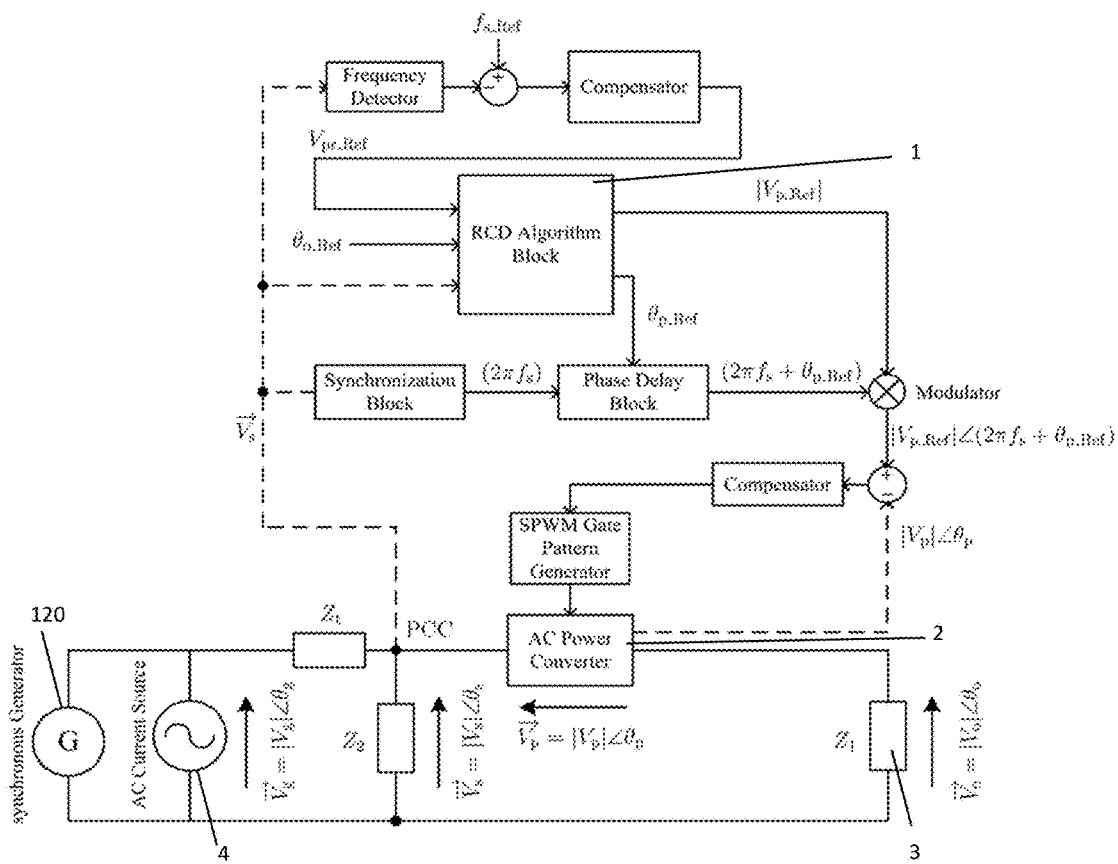
FIG. 18 is a schematic diagram of a system setup for simulating grid-frequency regulation control using an RCD power controller block in accordance with an embodiment of the present invention.

The control schematic of the RCD power controller 1 is shown in FIG. 18. $\theta_{o\_Ref}$ is set to control the power factor of the smart load. The reference value for the radial component $V_{pr\_Ref}$ is generated in a closed-loop control circuit where the grid frequency is regulated to a reference value of $f_{s\_Ref}$=50 Hz in the simulation. The grid frequency is obtained by using a frequency detector.

Figure 19:
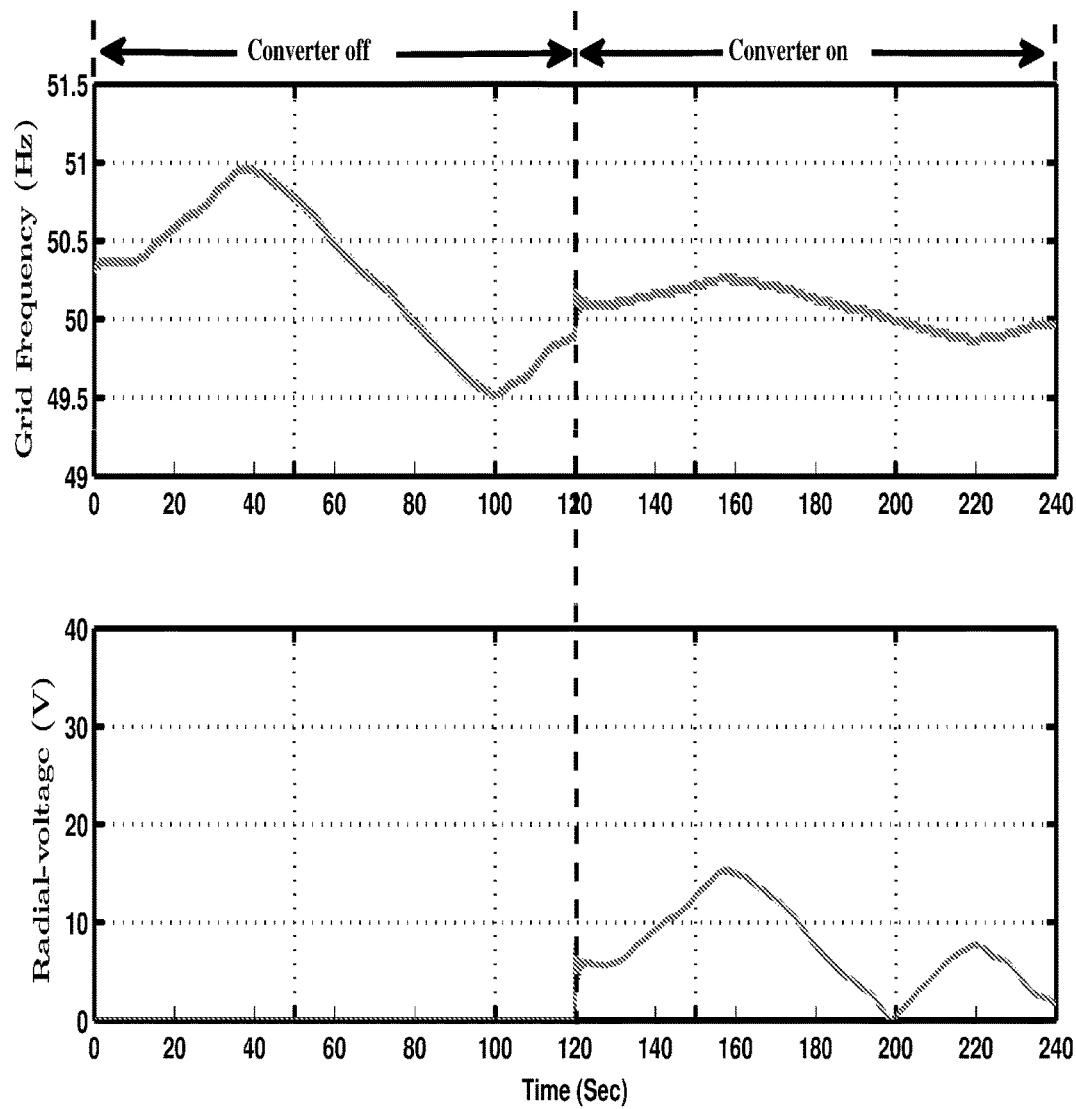
FIG. 19 shows graphs of waveforms of the power grid as simulated in FIG. 18 under grid-frequency control using an RCD power controller block in accordance with an embodiment of the present invention.
Figure 20A:
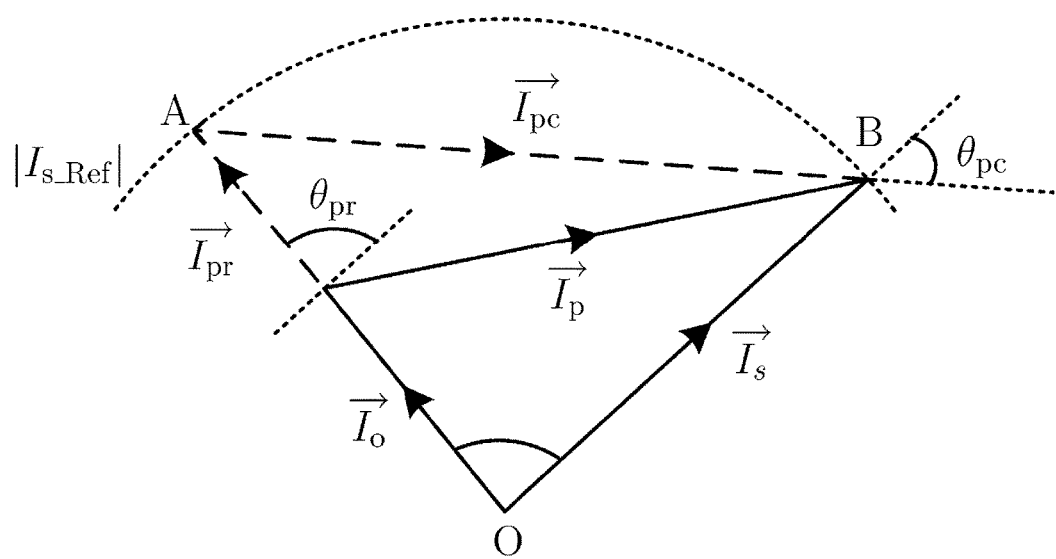
FIGS. 20A and 20B are schematic diagrams of two arbitrary states of the phasor currents in accordance with an equivalent of EQ. (1), as described below, but in respect of the electrical parameter of current, where the power converter current is decomposed into two components.
Figure 20B:
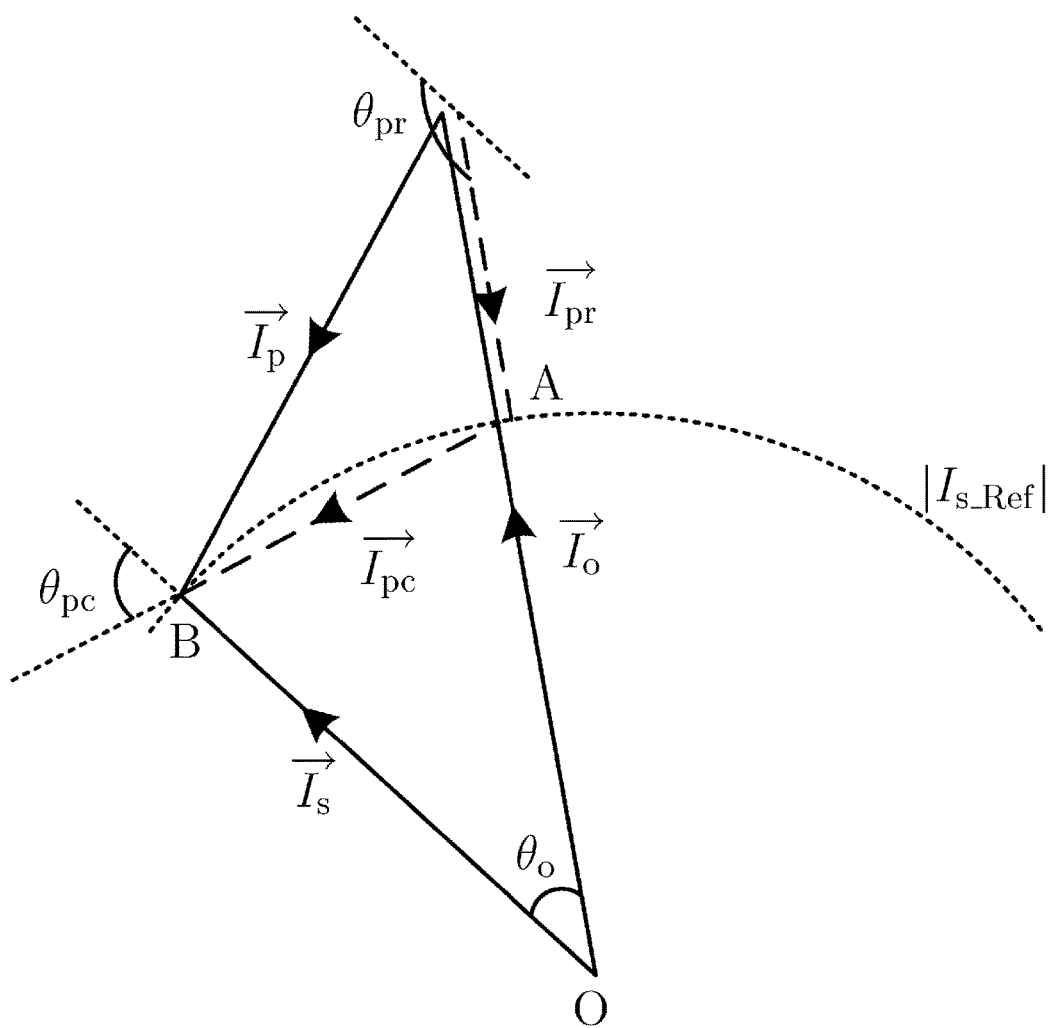

The simulated result is shown in FIG. 19. In the period from t=0 to 120 s, the AC power converter is turned off. The grid frequency is varied between 49.5 to 51 Hz. For the next 120 s (from t=121 to 240 s), the AC power converter is turned on. The variation of the frequency is reduced to within 49.7 to 50.3 Hz due to the feedback control of the RCD power controller 1.

It can be appreciated that the aforesaid embodiments are only exemplary embodiments adopted to describe the principles of the present invention, and the present invention is not merely limited thereto. Various variants and modifications may be made by those of ordinary skill in the art without departing from the spirit and essence of the present invention, and these variants and modifications are also covered within the scope of the present invention. Accordingly, although the invention has been described with reference to specific examples, it can be appreciated by those skilled in the art that the invention can be embodied in many other forms. It can also be appreciated by those skilled in the art that the features of the various examples described can be combined in other combinations.

The invention claimed is:

1. A power controller for an AC/DC power converter comprising an AC power port and connected in series with a load through the AC power port comprising two connections, wherein the series connection between the AC/DC power converter and the load comprises one of the two connections of the AC power port of the AC/DC power converter being connected to an AC power source, and the other connection of the two connections being connected to the load, wherein both of the AC/DC power converter and the load are capable of being configured to receive power from and deliver power to the AC power source, the power controller comprising:
a radial control block that controls a radial component of an electrical parameter of the AC/DC power converter connected in series with the load through the AC power port; and
a chordal control block that controls a chordal component of the electrical parameter of the AC/DC power converter.

2. A power controller according to claim 1 wherein the electrical parameter is one of: voltage, current, power, or frequency.

3. A power controller according to claim 1 comprising a first input, a second input, and a third input, wherein the first input is a magnitude of the electrical parameter of the AC power source, the second input is a desired magnitude of the radial component of the electrical parameter of the AC power converter, and the third input is a desired difference between a phase angle of the electrical parameter of the AC power source and a phase angle of the electrical parameter of the load.

4. A power controller according to claim 3 wherein the electrical parameter is voltage and the radial control block controls the radial component in accordance with the following relationships:

$$\theta_{pr} = \begin{cases} \theta_o & \text{for } |V_o| < |V_s| \\ 0 & \text{for } |V_o| = |V_s| \text{ (No radial-component)} \\ \theta_o - \pi & \text{for } |V_o| > |V_s| \end{cases}$$

and $$|V_{pr}| = ||V_o| - |V_s||.$$

5. A power controller according to claim 3 wherein the electrical parameter is voltage and the chordal control block controls the chordal component in accordance with the following relationship:

$$\begin{cases} \theta_{pc} = f_{\theta-chordal}(\theta_o) = -\text{sgn}(\theta_o) \cdot \dfrac{\pi - |\theta_o|}{2} \\ |V_{pc}| = f_{V-chordal}(\theta_o) = \sqrt{2|V_s|^2(1 - \cos\theta_o)} \end{cases} \text{for} -\pi < \theta_o < \pi.$$

6. A power controller according to claim 1 wherein the AC power source is a power grid and the power controller controls the radial and chordal components of the electrical parameter of the AC power converter in accordance with required values of one or more reference electrical parameters of the power grid.

7. A power controller according to claim 6 wherein the reference electrical parameters are one or more of the following: voltage, current, power, and power factor.

8. A power controller according to claim 1 comprising a summation block combining the radial and chordal components of the electrical parameter of the AC power converter output by the radial and chordal control blocks respectively to provide a reference magnitude and a reference phase angle for the electrical parameter of the AC power converter.

9. A power controller according to claim 1 wherein the power controller controls the radial and chordal components of the electrical parameter of the AC power converter in accordance with required values of one or more reference electrical parameters of the load or the AC power source.

10. A power controller according to claim 1 wherein the power controller controls the radial and chordal components of the electrical parameter of the AC power converter to provide active and reactive power compensation to the AC power source.

11. A power controller according to claim 1 wherein the power controller is integrated with the AC power converter.

12. A power controller according to claim 1 wherein the power controller and the AC power converter are integrated with the load.

13. A power system comprising one or more loads each connected in series to an AC power converter each controlled by a power controller according to claim 1.

14. A method of controlling an AC/DC power converter comprising an AC power port and connected in series with a load through the AC power port comprising two connections, wherein the series connection between the AC/DC power converter and the load comprises one of the two connections of the AC power port of the AC/DC power converter being connected to an AC power source, and the other connection of the two connections being connected to the load, wherein both of the AC/DC power converter and the load are capable of being configured to receive power from and deliver power to the AC power source, the method comprising:
  controlling a radial component of an electrical parameter of the AC/DC power converter connected in series with the load through the AC power port; and
  controlling a chordal component of the electrical parameter of the AC/DC power converter.

15. A method according to claim 14 wherein the electrical parameter is one of: voltage, current, power, or frequency.

16. A method according to claim 14 comprising controlling the radial and chordal components based on a magnitude of the electrical parameter of the AC power source, a desired magnitude of the radial component of the electrical parameter of the AC power converter, and a desired difference between a phase angle of the electrical parameter of the AC power source and a phase angle of the electrical parameter of the load.

17. A method according to claim 16 wherein the electrical parameter is voltage and the radial component is controlled in accordance with the following relationships:

$$\theta_{pr} = \begin{cases} \theta_o & \text{for } |V_o| < |V_s| \\ 0 & \text{for } |V_o| = |V_s| \text{ (No radial-component)} \\ \theta_o - \pi & \text{for } |V_o| > |V_s| \end{cases}$$

and $$|V_{pr}| = ||V_o| - |V_s||.$$

18. A method according to claim 16 wherein the electrical parameter is voltage and the chordal component is controlled in accordance with the following relationship:

$$\begin{cases} \theta_{pc} = f_{\theta-chordal}(\theta_o) = -\text{sgn}(\theta_o) \cdot \dfrac{\pi - |\theta_o|}{2} \\ |V_{pc}| = f_{V-chordal}(\theta_o) = \sqrt{2|V_s|^2(1 - \cos\theta_o)} \end{cases} \text{for } -\pi < \theta_o < \pi.$$

19. A method according to claim 14 comprising combining the radial and chordal components of the electrical parameter of the AC power converter to provide a reference magnitude and a reference phase angle for the electrical parameter of the AC power converter.

20. A method according to claim 14 wherein the AC power source is a power grid and the radial and chordal components of the electrical parameter of the AC power converter are controlled in accordance with required values of one or more reference electrical parameters of the power grid.

21. A method according to claim 20 wherein the reference electrical parameters are one or more of the following: voltage, current, power, and power factor.

22. A method according to claim 14 wherein the radial and chordal components of the electrical parameter of the AC power converter are controlled in accordance with required values of one or more reference electrical parameters of the load or the AC power source.

23. A method according to claim 14 wherein the radial and chordal components of the electrical parameter of the AC power converter are controlled to provide active and reactive power compensation to the AC power source.

* * * * *

UNITED STATES PATENT AND TRADEMARK OFFICE
CERTIFICATE OF CORRECTION

PATENT NO. : 10,468,977 B2
APPLICATION NO. : 15/526988
DATED : November 5, 2019
INVENTOR(S) : Kwan Tat Mok, Siew Chong Tan and Shu Yuen Ron Hui It is certified that error appears in the above-identified patent and that said Letters Patent is hereby corrected as shown below:

In the Specification

Column 8,
Line 67, "$|Z_{s1}|\angle\phi_{s1}=R_{s1}+jX_{s1}$, in which $|Z_{s1}|$" should read --$|Z_{sl}|\angle\phi_{sl}=R_{sl}+jX_{sl}$, in which $|Z_{sl}|$--.

Column 9,
Line 1, "smart load and $\phi_{s1}$" should read --smart load and $\phi_{sl}$--.

Column 10,
Lines 45-46, "$V_{pr\_Ref}$ and 60(iii)" should read --$V_{pr\_Ref}$ 60 and (iii)--.

Signed and Sealed this
Fifth Day of May, 2020

Andrei Iancu
*Director of the United States Patent and Trademark Office*